(12) United States Patent
Wu et al.

(10) Patent No.: US 10,959,091 B2
(45) Date of Patent: Mar. 23, 2021

(54) NETWORK HANDOVER PROTECTION METHOD, RELATED DEVICE, AND SYSTEM

(71) Applicant: Huawei Technologies Co., Ltd., Shenzhen (CN)

(72) Inventors: Rong Wu, Shenzhen (CN); Bo Zhang, Shenzhen (CN); Lu Gan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/351,254

(22) Filed: Mar. 12, 2019

(65) Prior Publication Data

US 2019/0215903 A1 Jul. 11, 2019

Related U.S. Application Data

(63) Continuation of application No. PCT/CN2017/090277, filed on Jun. 27, 2017.

(30) Foreign Application Priority Data

Sep. 13, 2016 (CN) .......................... 201610822515.9

(51) Int. Cl.
*H04W 80/10* (2009.01)
*H04W 12/04* (2021.01)
(Continued)

(52) U.S. Cl.
CPC . *H04W 12/0401* (2019.01); *H04W 12/04033* (2019.01); *H04W 12/08* (2013.01);
(Continued)

(58) Field of Classification Search
CPC .................................................... H04W 80/10
See application file for complete search history.

(56) References Cited

U.S. PATENT DOCUMENTS

| 2007/0060127 | A1 | 3/2007 | Forsberg |
| 2008/0226083 | A1* | 9/2008 | Yi ......................... H04L 9/0841 380/282 |

(Continued)

FOREIGN PATENT DOCUMENTS

| CN | 101340708 A | 1/2009 |
| CN | 101841413 A | 9/2010 |

(Continued)

OTHER PUBLICATIONS

"3rd Generation Partnership Project; Technical Specification Group Services and System Aspects; Feasibility Study on New Services and Markets Technology Enablers; Stage 1 (Release 14)," 3GPP TR 22.891 V14.1.0, Jun. 2016, 95 pages.

(Continued)

*Primary Examiner* — John D Blanton
(74) *Attorney, Agent, or Firm* — Slater Matsil, LLP

(57) ABSTRACT

A method includes: receiving, by a session management device, a path switching request used to request to hand over user equipment UE from a source network to a target network; obtaining a target security policy based on the path switching request, and obtaining a second shared key generated based on a first shared key and the target security policy, and sending the second shared key to a target gateway; and sending, by the session management device, the second shared key to the UE; or sending the target security policy to the UE, so that the UE generates the second shared key based on the first shared key and the target security policy, where the second shared key is used to perform end-to-end protection on secure data transmission between the UE and the target gateway.

20 Claims, 15 Drawing Sheets

(51) Int. Cl.
*H04W 36/00* (2009.01)
*H04W 12/08* (2021.01)
*H04W 36/14* (2009.01)

(52) U.S. Cl.
CPC ....... *H04W 36/0038* (2013.01); *H04W 36/14* (2013.01); *H04W 80/10* (2013.01)

(56) References Cited

U.S. PATENT DOCUMENTS

| | | | |
|---|---|---|---|
| 2013/0003972 A1 | 1/2013 | Kang et al. | |
| 2013/0058308 A1* | 3/2013 | Jaiswal | H04L 47/34 370/331 |
| 2014/0304785 A1* | 10/2014 | Kafle | H04L 61/1511 726/5 |
| 2015/0281233 A1* | 10/2015 | Asenjo | H04L 63/068 726/7 |
| 2017/0310475 A1* | 10/2017 | Hu | H04L 9/0656 |
| 2018/0013557 A1* | 1/2018 | Jain | G06F 21/6209 |

FOREIGN PATENT DOCUMENTS

| | | |
|---|---|---|
| CN | 101946535 A | 1/2011 |
| CN | 102137397 A | 7/2011 |
| CN | 102223231 A | 10/2011 |
| CN | 103428787 A | 12/2013 |
| CN | 103840941 A | 6/2014 |
| CN | 105813079 A | 7/2016 |
| CN | 101552983 A | 10/2019 |
| WO | 2016073229 A1 | 5/2016 |

OTHER PUBLICATIONS

Tao, Yan,"Research on the Key Problems of Privacy Protection and Key Management in the Internet of Things", Beijing University of Posts and Telecommunications, 2012, 115 pages.

XP051123425—3GPP TS 33.401 V13.3.0 (Jun. 2016), 3rd Generation Partnership Project; Technical Specification Group Services and System Aspects; 3GPP System Architecture Evolution (SAE); Security architecture(Release 13), 148 pages.

XP051138928—3GPP TR 23.799 V0.7.0 (Aug. 2016), 3rd Generation Partnership Project; Technical Specification Group Services and System Aspects; Study on Architecture for Next Generation System(Release 14), 322 pages.

XP501172387—3GPP TR 33.899 V0.4.0 (Aug. 2016), 3rd Generation Partnership Project; Technical Specification Group Services and System Aspects; Study on the security aspects of the next generation system (Release 14), 156 pages.

* cited by examiner

NETWORK HANDOVER PROTECTION METHOD, RELATED DEVICE, AND SYSTEM

CROSS-REFERENCE TO RELATED APPLICATIONS

This application is a continuation of International Application No. PCT/CN2017/090277, filed on Jun. 27, 2017, which claims priority to a continuation of Chinese Application No. 201610822515.9, filed on Sep. 13, 2016. The disclosures of the aforementioned applications are hereby incorporated by reference in their entireties.

TECHNICAL FIELD

The present invention relates to the field of computer technologies, and in particular, to a network handover protection method, a related device, and a system.

BACKGROUND

Future 5th generation (5G) networks are developing toward diversified, broadband, comprehensive, and intelligent networks. With popularity of various user equipments (UE), mobile data traffic explodes. To improve traffic transmission efficiency, an interaction procedure of the 5G network is correspondingly improved. For example, in the 5G technology, when transmitting data in a network, the UE does not need to verify data security between the UE and a radio access network (RAN) device. The RAN is configured to forward data between the UE and a UP-GW. A task of verifying data security is performed by the UE and a user plane gateway (UP-GW) in the network. To be specific, the UE and the UP-GW perform end-to-end protection on secure data transmission.

FIG. 1 is a schematic flowchart of a 5G network that is being studied. Network elements for performing the procedure include UE, a RAN, a UP-GW, and the like. The procedure is substantially as follows:

Step 1: The UE transmits data in a network that the UE currently camps on (which may be referred to as a "source network"). The UE and the UP-GW pre-negotiate a shared key to protect secure data transmission.

Step 2: The UE performs a handover from the source network to a new network. In future 5G, the UE may be triggered to be handed over based on information such as current load of the network, a geographical location change of the UE, and a signal strength of the current network. A user plane gateway in the new network may be referred to as a target UP-GW.

Step 3: The UE establishes a new session to the target UP-GW.

Step 4: The UE transmits data in the new network based on the new session, and the UE and the UP-GW protect secure data transmission together.

Step 5: The UE negotiates with the UP-GW in the network before the handover, to release a session in the previous network. It may be understood that steps 4 and 5 may be exchanged or simultaneously performed.

In the foregoing procedure, when the UE establishes a new session to the target UP-GW, a new shared key needs to be generated. Subsequently, the UE and the target UP-GW use the shared key to protect secure data transmission in the new network. How to generate the shared key of the UE in the new network is a problem that a person skilled in the art is currently studying.

SUMMARY

Embodiments of the present invention disclose a network handover protection method, a related device, and a system, so that the UE can still securely transmit data after a network handover.

According to a first aspect, an embodiment of the present invention provides a network handover protection method. The method includes: receiving, by a session management device, a path switching request used to request to hand over user equipment UE from a source network to a target network. The source network is a network on which the UE currently camps. The method further includes obtaining, by the session management device, a target security policy based on the path switching request. The target security policy is an initial security policy or a security policy obtained by processing the initial security policy according to a preset rule. The initial security policy defines a manner of generating a reference shared key. The reference shared key is a key generated based on a base key and is used by the UE to perform end-to-end protection on secure data transmission in the source network, and the base key is a key generated through two-way authentication between the UE and the source network or a key derived based on the key generated through two-way authentication between the UE and the source network. The method further includes obtaining, by the session management device, a second shared key generated based on a first shared key and the target security policy, and sending the second shared key to a target gateway; or sending the target security policy and the pre-obtained first shared key to the target gateway, so that the target gateway generates the second shared key based on the first shared key and the target security policy. The first shared key is the reference shared key or the base key, and the target gateway is a user plane gateway of the target network. The method further includes sending, by the session management device, the second shared key to the UE; or sending the target security policy to the UE, so that the UE generates the second shared key based on the first shared key and the target security policy. The second shared key is used to perform end-to-end protection on secure data transmission between the UE and the target gateway.

The foregoing steps are performed, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

With reference to the first aspect, in a first possible implementation of the first aspect, the obtaining, by the session management device, a target security policy based on the path switching request includes: sending, by the session management device, a security policy request message to a security policy function and receiving, by the session management device, the target security policy sent by the security policy function. The security policy function is configured to manage a security policy related to a device in the source network and/or the target network.

With reference to the first aspect, in a second possible implementation of the first aspect, the session management device includes a source session management device and a target session management device, the source session management device is configured to manage a session of each user equipment in the source network, and the target session management device is configured to manage a session of each user equipment in the target network. The receiving, by a session management device, a path switching request used to request to hand over user equipment UE from a source network to a target network includes: receiving, by the source session management device, the path switching request used to request to hand over the user equipment UE from the source network to the target network. The obtaining, by the session management device, a target security policy based on the path switching request includes: obtaining, by the source session management device, the initial security policy, and sending the initial security policy to the target session management device, so that the target session management device obtains the target security policy based on the initial security policy; the obtaining, by the session management device, a second shared key generated based on a first shared key and the target security policy, and sending the second shared key to a target gateway includes: obtaining, by the target session management device, the second shared key generated based on the first shared key and the target security policy, and sending the second shared key to the target gateway; and the sending, by the session management device, the target security policy to the UE includes: sending, by the target session management device, the target security policy to the UE.

With reference to the second possible implementation of the first aspect, in a third possible implementation of the first aspect, after the receiving, by the source session management device, the path switching request used to request to hand over the user equipment UE from the source network to the target network, and before the obtaining, by the target session management device, the second shared key generated based on the first shared key and the target security policy, and sending the second shared key to the target gateway, the method further includes: sending, by the source session management device, a key request message to a source key management device, where the source key management device is configured to manage a shared key that is of each user equipment accessing the source network and that is used to perform end-to-end protection on secure data transmission; and receiving, by the source session management device, the first shared key sent by the source key management device based on the key request message, and sending the first shared key to the target session management device.

With reference to the first aspect, or the first possible implementation of the first aspect, or the second possible implementation of the first aspect, or the third possible implementation of the first aspect, in a fourth possible implementation of the first aspect, the obtaining, by the session management device, a second shared key generated based on a first shared key and the target security policy includes: sending the target security policy to a target key management device, where the target key management device is configured to manage a shared key that is of each user equipment accessing the target network and that is used to perform end-to-end protection on secure data transmission; and receiving the second shared key generated by the target key management device based on the target security policy and the pre-obtained first shared key.

With reference to the first aspect, or the first possible implementation of the first aspect, or the second possible implementation of the first aspect, or the third possible implementation of the first aspect, in a fifth possible implementation of the first aspect, the obtaining, by the session management device, a second shared key generated based on a first shared key and the target security policy includes: generating the second shared key based on the target security policy and the pre-obtained first shared key.

With reference to the first aspect, or the first possible implementation of the first aspect, or the second possible implementation of the first aspect, or the third possible implementation of the first aspect, or the fourth possible implementation of the first aspect, or the fifth possible implementation of the first aspect, in a sixth possible implementation of the first aspect, both the initial security policy and the target security policy define at least one of a key algorithm, a key length, and a key update period.

With reference to the first aspect, or the first possible implementation of the first aspect, or the second possible implementation of the first aspect, or the third possible implementation of the first aspect, or the fourth possible implementation of the first aspect, or the sixth possible implementation of the first aspect, in a seventh possible implementation of the first aspect, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

According to a second aspect, an embodiment of the present invention provides a network handover protection method. The method includes: receiving, by a key management device, a target security policy sent by a session management device after the session management device receives a path switching request The path switching request is used to request to hand over user equipment UE from a source network to a target network, the target security policy is an initial security policy or a security policy obtained by processing the initial security policy according to a preset rule. The initial security policy defines a manner of generating a reference shared key. The reference shared key is a key generated based on a base key and is used by the UE to perform end-to-end protection on secure data transmission in the source network, and the base key is a key generated through two-way authentication between the UE and the source network or a key derived based on the key generated through two-way authentication between the UE and the source network. The method further includes generating, by the key management device, a second shared key based on the target security policy and a pre-obtained first shared key. The first shared key is the reference shared key or the base key. The method further includes sending, by the key management device, the second shared key to the session management device, so that the session management device sends the second shared key to a target gateway. The target gateway is a user plane gateway of the target network, and the second shared key is used to perform end-to-end protection on secure data transmission between the UE and the target gateway.

The foregoing steps are performed, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

With reference to the second aspect, in a first possible implementation of the second aspect, before the generating, by the key management device, a second shared key based on the target security policy and a pre-obtained first shared key, the method further includes: receiving, by the key management device, the first shared key sent by the session management device after the session management device receives the path switching request, where the session management device prestores the first shared key or the session management device pre-obtains the first shared key from a device that manages a key in the source network.

With reference to the second aspect, in a second possible implementation of the second aspect, before the generating, by the key management device, a second shared key based on the target security policy and a pre-obtained first shared key, the method further includes: sending, by the key management device, a key query request to a device that manages a key in the source network, where the key query request is used to request to query a shared key used by the UE to perform end-to-end protection on secure data transmission in the source network; and receiving, by the key management device, the first shared key sent by the device that manages a key.

With reference to the second aspect, in a third possible implementation of the second aspect, the key management device is configured to manage a key of each user equipment in the source network and the target network, and the key management device stores the first shared key.

With reference to the second aspect, or the first possible implementation of the second aspect, or the second possible implementation of the second aspect, or the third possible implementation of the second aspect, in a fourth possible implementation of the second aspect, both the initial security policy and the target security policy define at least one of a key algorithm, a key length, and a key update period.

With reference to the second aspect, or the first possible implementation of the second aspect, or the second possible implementation of the second aspect, or the third possible implementation of the second aspect, or the fourth possible implementation of the second aspect, in a fifth possible implementation of the second aspect, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

According to a third aspect, an embodiment of the present invention provides a network handover protection method. The method includes: sending, by user equipment, a session re-establishment request to a target network, where the session re-establishment request is used to trigger to re-establish a session to a session management device in the target network; receiving, by the user equipment, a target security policy sent by the session management device after the session management device receives a path switching request, where the path switching request is used to request to hand over the user equipment UE from a source network to the target network, the target security policy is an initial security policy or a security policy obtained by processing the initial security policy according to a preset rule, the initial security policy defines a manner of generating a reference shared key, the reference shared key is a key generated based on a base key and is used by the UE to perform end-to-end protection on secure data transmission in the source network, and the base key is a key generated through two-way authentication between the UE and the source network or a key derived based on the key generated through two-way authentication between the UE and the source network; and generating, by the user equipment, a second shared key based on the target security policy and a first shared key of the user equipment, where the second shared key is used to perform end-to-end protection on secure data transmission between the UE and a target gateway, the target gateway is a user plane gateway of the target network, and the first shared key is the reference shared key or the base key.

The foregoing operations are performed, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

With reference to the third aspect, in a first possible implementation of the third aspect, both the initial security policy and the target security policy define at least one of a key algorithm, a key length, and a key update period.

With reference to the third aspect, or the first possible implementation of the third aspect, in a second possible implementation of the third aspect, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

According to a fourth aspect, an embodiment of the present invention provides a session management device. The session management device includes a first receiving unit, configured to receive a path switching request used to request to hand over user equipment UE from a source network to a target network, where the source network is a network on which the UE currently camps. The session management device further includes a first obtaining unit, configured to obtain a target security policy based on the path switching request. The target security policy is an initial security policy or a security policy obtained by processing the initial security policy according to a preset rule, the initial security policy defines a manner of generating a reference shared key, the reference shared key is a key generated based on a base key and is used by the UE to perform end-to-end protection on secure data transmission in the source network. The base key is a key generated through two-way authentication between the UE and the source network or a key derived based on the key generated through two-way authentication between the UE and the source network. The session management device further includes a second obtaining unit, configured to: obtain a second shared key generated based on a first shared key and the target security policy, and send the second shared key to a target gateway; or send the target security policy and the pre-obtained first shared key to the target gateway, so that the target gateway generates the second shared key based on the first shared key and the target security policy, where the first shared key is the reference shared key or the base key, and the target gateway is a user plane gateway of the target network; and a first sending unit, configured to send the second shared key to the UE; or send the target security policy to the UE, so that the UE generates the second shared key based on the first shared key and the target security policy, where the second shared key is used to perform end-to-end protection on secure data transmission between the UE and the target gateway.

The foregoing operations are performed, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

With reference to the fourth aspect, in a first possible implementation of the fourth aspect, the first obtaining unit is specifically configured to: send a security policy request message to a security policy function, where the security policy function is configured to manage a security policy related to a device in the source network and/or the target network; and receive the target security policy sent by the security policy function.

With reference to the fourth aspect, in a second possible implementation of the fourth aspect, the session management device includes a source session management device and a target session management device, the source session management device is configured to manage a session of each user equipment in the source network, and the target session management device is configured to manage a session of each user equipment in the target network; the source session management device includes the first receiving unit and the first obtaining unit; and the target session management device includes the second obtaining unit and the first sending unit; the first obtaining unit is specifically configured to: obtain the initial security policy, and send the initial security policy to the target session management device, so that the target session management device obtains the target security policy based on the initial security policy; and the second obtaining unit is specifically configured to: obtain the second shared key generated based on the first shared key and the target security policy, and send the second shared key to the target gateway.

With reference to the second possible implementation of the fourth aspect, in a third possible implementation of the fourth aspect, the source session management device further includes a second sending unit and a second receiving unit; the second sending unit is configured to: after the receiving unit receives the path switching request used to request to hand over the user equipment UE from the source network to the target network, and before the second obtaining unit obtains the second shared key generated based on the first shared key and the target security policy, and sends the second shared key to the target gateway, send a key request message to a source key management device, where the source key management device is configured to manage a shared key that is of each user equipment accessing the source network and that is used to perform end-to-end protection on secure data transmission; and the second receiving unit is configured to: receive the first shared key sent by the source key management device based on the key request message, and send the first shared key to the target session management device.

With reference to the fourth aspect, or the first possible implementation of the fourth aspect, or the second possible implementation of the fourth aspect, or the third possible implementation of the fourth aspect, in a fourth possible implementation of the fourth aspect, the second obtaining unit is specifically configured to: send the target security policy to a target key management device, where the target key management device is configured to manage a shared key that is of each user equipment accessing the target network and that is used to perform end-to-end protection on secure data transmission; and receive the second shared key generated by the target key management device based on the target security policy and the pre-obtained first shared key.

With reference to the fourth aspect, or the first possible implementation of the fourth aspect, or the second possible implementation of the fourth aspect, or the third possible implementation of the fourth aspect, in a fifth possible implementation of the fourth aspect, the second obtaining unit is specifically configured to generate the second shared key based on the target security policy and the pre-obtained first shared key.

With reference to the fourth aspect, or the first possible implementation of the fourth aspect, or the second possible implementation of the fourth aspect, or the third possible implementation of the fourth aspect, or the fourth possible implementation of the fourth aspect, or the fifth possible implementation of the fourth aspect, in a sixth possible implementation of the fourth aspect, both the initial security policy and the target security policy define at least one of a key algorithm, a key length, and a key update period.

With reference to the fourth aspect, or the first possible implementation of the fourth aspect, or the second possible implementation of the fourth aspect, or the third possible implementation of the fourth aspect, or the fourth possible implementation of the fourth aspect, or the sixth possible implementation of the fourth aspect, in a seventh possible implementation of the fourth aspect, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

According to a fifth aspect, an embodiment of the present invention provides a key management device. The key management device includes a first receiving unit, configured to receive a target security policy sent by a session management device after the session management device receives a path switching request. The path switching request is used to request to hand over user equipment UE from a source network to a target network. The target security policy is an initial security policy or a security policy obtained by processing the initial security policy according to a preset rule, the initial security policy defines a manner of generating a reference shared key. The reference shared key is a key generated based on a base key and is used by the UE to perform end-to-end protection on secure data transmission in the source network. The base key is a key generated through two-way authentication between the UE and the source network or a key derived based on the key generated through two-way authentication between the UE and the source network. The key management device further includes a generation unit, configured to generate a second shared key based on the target security policy and a pre-obtained first shared key, where the first shared key is the reference shared key or the base key; and a first sending unit, configured to send the second shared key to the session management device, so that the session management device sends the second shared key to a target gateway. The target gateway is a user plane gateway of the target network, and the second shared key is used to perform end-to-end protection on secure data transmission between the UE and the target gateway.

The foregoing units are run, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

With reference to the fifth aspect, in a first possible implementation of the fifth aspect, the key management device further includes: a second receiving unit, configured to: before the key management device generates the second shared key based on the target security policy and the pre-obtained first shared key, receive the first shared key sent by the session management device after the session management device receives the path switching request, where the session management device prestores the first shared key or the session management device pre-obtains the first shared key from a device that manages a key in the source network.

With reference to the fifth aspect, in a second possible implementation of the fifth aspect, the key management device further includes: a second sending unit, configured to: before the key management device generates the second shared key based on the target security policy and the pre-obtained first shared key, send a key query request to a device that manages a key in the source network, where the key query request is used to request to query a shared key used by the UE to perform end-to-end protection on secure data transmission in the source network; and a third receiving unit, configured to receive the first shared key sent by the device that manages a key.

With reference to the fifth aspect, in a third possible implementation of the fifth aspect, the key management device is configured to manage a key of each user equipment in the source network and the target network, and the key management device stores the first shared key.

With reference to the fifth aspect, or the first possible implementation of the fifth aspect, or the second possible implementation of the fifth aspect, or the third possible implementation of the fifth aspect, in a fourth possible implementation of the fifth aspect, both the initial security policy and the target security policy define at least one of a key algorithm, a key length, and a key update period.

With reference to the fifth aspect, or the first possible implementation of the fifth aspect, or the second possible implementation of the fifth aspect, or the third possible implementation of the fifth aspect, or the fourth possible implementation of the fifth aspect, in a fifth possible implementation of the fifth aspect, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

According to a sixth aspect, an embodiment of the present invention provides user equipment. The user equipment includes: a sending unit, configured to send a session re-establishment request to a target network. The session re-establishment request is used to trigger to re-establish a session to a session management device in the target network. The user equipment further includes a receiving unit, configured to receive a target security policy sent by the session management device after the session management device receives a path switching request. The path switching request is used to request to hand over the user equipment UE from a source network to the target network. The target security policy is an initial security policy or a security policy obtained by processing the initial security policy according to a preset rule. The initial security policy defines a manner of generating a reference shared key, the reference shared key is a key generated based on a base key and is used by the UE to perform end-to-end protection on secure data transmission in the source network, and the base key is a key generated through two-way authentication between the UE and the source network or a key derived based on the key generated through two-way authentication between the UE and the source network. The user equipment further includes a generation unit, configured to generate a second shared key based on the target security policy and a first shared key of the user equipment, where the second shared key is used to perform end-to-end protection on secure data transmission between the UE and a target gateway, the target gateway is a user plane gateway of the target network, and the first shared key is the reference shared key or the base key.

The foregoing units are run, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

With reference to the sixth aspect, in a first possible implementation of the sixth aspect, both the initial security policy and the target security policy define at least one of a key algorithm, a key length, and a key update period.

With reference to the sixth aspect, or the first possible implementation of the sixth aspect, in a second possible implementation of the sixth aspect, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

According to a seventh aspect, an embodiment of the present invention provides a session management device. The session management device includes a processor, a memory, and a transceiver; the memory is configured to store data and a program. The processor is configured to invoke the program stored in the memory to perform the following operations. The operations include receiving, by using the transceiver, a path switching request used to request to hand over user equipment UE from a source network to a target network. The source network is a network on which the UE currently camps. The operations include obtaining a target security policy based on the path switching request, where the target security policy is an initial security policy or a security policy obtained by processing the initial security policy according to a preset rule. The initial security policy defines a manner of generating a reference shared key, and the reference shared key is a key generated based on a base key and is used by the UE to perform end-to-end protection on secure data transmission in the source network. The base key is a key generated through two-way authentication between the UE and the source network or a key derived based on the key generated through two-way authentication between the UE and the source network. The operations include obtaining a second shared key generated based on a first shared key and the target security policy, and sending the second shared key to a target gateway. Or the operations include sending the target security policy and the pre-obtained first shared key to the target gateway, so that the target gateway generates the second shared key based on the first shared key and the target security policy, where the first shared key is the reference shared key or the base key, and the target gateway is a user plane gateway of the target network; and sending the second shared key to the UE by using the transceiver. Or the operations include sending the target security policy to the UE by using the transceiver, so that the UE generates the second shared key based on the first shared key and the target security policy, where the second shared key is used to perform end-to-end protection on secure data transmission between the UE and the target gateway.

The foregoing operations are performed, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

With reference to the seventh aspect, in a first possible implementation of the seventh aspect, the obtaining, by the processor, a target security policy based on the path switching request is specifically: sending, by using the transceiver, a security policy request message to a security policy function, where the security policy function is configured to manage a security policy related to a device in the source network and/or the target network; and receiving, by using the transceiver, the target security policy sent by the security policy function.

With reference to the seventh aspect, in a second possible implementation of the seventh aspect, the session management device includes a source session management device and a target session management device, the source session management device is configured to manage a session of each user equipment in the source network, and the target session management device is configured to manage a session of each user equipment in the target network; the source session management device includes a first processor and a first transceiver; and the target session management device includes a second processor and a second transceiver; the receiving, by the processor by using the transceiver, a path switching request used to request to hand over user equipment UE from a source network to a target network is specifically: receiving, by the first processor by using the first transceiver, the path switching request used to request to hand over the user equipment UE from the source network to the target network; the obtaining, by the processor, a target security policy based on the path switching request includes: obtaining, by the first processor, the initial security policy, and sending the initial security policy to the target session management device, so that the target session management device obtains the target security policy based on the initial security policy; the obtaining, by the processor, a second shared key generated based on a first shared key and the target security policy, and sending the second shared key to a target gateway includes: obtaining, by the second processor, the second shared key generated based on the first shared key and the target security policy, and sending the second shared key to the target gateway; and the sending, by the processor, the target security policy to the UE by using the transceiver includes: sending, by the second processor, the target security policy to the UE by using the second transceiver.

With reference to the second possible implementation of the seventh aspect, in a third possible implementation of the seventh aspect, after the receiving, by the first processor by using the first transceiver, the path switching request used to request to hand over the user equipment UE from the source network to the target network, and before the obtaining, by the second processor, the second shared key generated based on the first shared key and the target security policy, and sending the second shared key to the target gateway, the first processor is further configured to: send a key request message to a source key management device by using the first transceiver, where the source key management device is configured to manage a shared key that is of each user equipment accessing the source network and that is used to perform end-to-end protection on secure data transmission; and receive, by using the first transceiver, the first shared key sent by the source key management device based on the key request message, and send the first shared key to the target session management device.

With reference to the seventh aspect, or the first possible implementation of the seventh aspect, or the second possible implementation of the seventh aspect, or the third possible implementation of the seventh aspect, in a fourth possible implementation of the seventh aspect, the obtaining, by the processor, a second shared key generated based on a first shared key and the target security policy is specifically: sending the target security policy to a target key management device, where the target key management device is configured to manage a shared key that is of each user equipment accessing the target network and that is used to perform end-to-end protection on secure data transmission; and receiving the second shared key generated by the target key management device based on the target security policy and the pre-obtained first shared key.

With reference to the seventh aspect, or the first possible implementation of the seventh aspect, or the second possible implementation of the seventh aspect, or the third possible implementation of the seventh aspect, in a fifth possible implementation of the seventh aspect, the obtaining, by the processor, a second shared key generated based on a first shared key and the target security policy is specifically: generating the second shared key based on the target security policy and the pre-obtained first shared key.

With reference to the seventh aspect, or the first possible implementation of the seventh aspect, or the second possible implementation of the seventh aspect, or the third possible implementation of the seventh aspect, or the fourth possible implementation of the seventh aspect, or the fifth possible implementation of the seventh aspect, in a sixth possible implementation of the seventh aspect, both the initial security policy and the target security policy define at least one of a key algorithm, a key length, and a key update period.

With reference to the seventh aspect, or the first possible implementation of the seventh aspect, or the second possible implementation of the seventh aspect, or the third possible implementation of the seventh aspect, or the fourth possible implementation of the seventh aspect, or the sixth possible implementation of the seventh aspect, in a seventh possible implementation of the seventh aspect, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

According to an eighth aspect, an embodiment of the present invention provides a key management device. The key management device includes a processor, a memory, and a transceiver; the memory is configured to store data and a program; and the processor is configured to invoke the program stored in the memory to perform the following operations. The operations include receiving, by using the transceiver, a target security policy sent by a session management device after the session management device receives a path switching request, where the path switching request is used to request to hand over user equipment UE from a source network to a target network, the target security policy is an initial security policy or a security policy obtained by processing the initial security policy according to a preset rule. The initial security policy defines a manner of generating a reference shared key, and the reference shared key is a key generated based on a base key and is used by the UE to perform end-to-end protection on secure data transmission in the source network. The base key is a key generated through two-way authentication between the UE and the source network or a key derived based on the key generated through two-way authentication between the UE and the source network. The operations include generating a second shared key based on the target security policy and a pre-obtained first shared key, where the first shared key is the reference shared key or the base key; and sending the second shared key to the session management device by using the transceiver, so that the session management device sends the second shared key to a target gateway. The target gateway is a user plane gateway of the target network, and the second shared key is used to perform end-to-end protection on secure data transmission between the UE and the target gateway.

The foregoing operations are performed, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

With reference to the eighth aspect, in a first possible implementation of the eighth aspect, before generating the second shared key based on the target security policy and the pre-obtained first shared key, the processor is further configured to: receive, by using the transceiver, the first shared key sent by the session management device after the session management device receives the path switching request, where the session management device prestores the first shared key or the session management device pre-obtains the first shared key from a device that manages a key in the source network.

With reference to the eighth aspect, in a second possible implementation of the eighth aspect, before generating the second shared key based on the target security policy and the pre-obtained first shared key, the processor is further configured to: send, by using the transceiver, a key query request to a device that manages a key in the source network, where the key query request is used to request to query a shared key used by the UE to perform end-to-end protection on secure data transmission in the source network; and receive, by using the transceiver, the first shared key sent by the device that manages a key.

With reference to the eighth aspect, in a third possible implementation of the eighth aspect, the key management device is configured to manage a key of each user equipment in the source network and the target network, and the key management device stores the first shared key.

With reference to the eighth aspect, or the first possible implementation of the eighth aspect, or the second possible implementation of the eighth aspect, or the third possible implementation of the eighth aspect, in a fourth possible implementation of the eighth aspect, both the initial security policy and the target security policy define at least one of a key algorithm, a key length, and a key update period.

With reference to the eighth aspect, or the first possible implementation of the eighth aspect, or the second possible implementation of the eighth aspect, or the third possible implementation of the eighth aspect, or the fourth possible implementation of the eighth aspect, in a fifth possible implementation of the eighth aspect, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

According to a ninth aspect, an embodiment of the present invention provides user equipment. The user equipment includes a processor, a memory, and a transceiver; the memory is configured to store data and a program; and the processor is configured to invoke the program stored in the memory to perform the following operations. The operations include sending, by using the transceiver, a session re-establishment request to a target network, where the session re-establishment request is used to trigger to re-establish a session to a session management device in the target network. The operations include receiving, by using the transceiver, a target security policy sent by the session management device after the session management device receives a path switching request. The path switching request is used to request to hand over the user equipment UE from a source network to the target network, the target security policy is an initial security policy or a security policy obtained by processing the initial security policy according to a preset rule, the initial security policy defines a manner of generating a reference shared key, the reference shared key is a key generated based on a base key and is used by the UE to perform end-to-end protection on secure data transmission in the source network, and the base key is a key generated through two-way authentication between the UE and the source network or a key derived based on the key generated through two-way authentication between the UE and the source network. The operations include generating a second shared key based on the target security policy and a first shared key of the user equipment. The second shared key is used to perform end-to-end protection on secure data transmission between the UE and a target gateway, the target gateway is a user plane gateway of the target network, and the first shared key is the reference shared key or the base key.

The foregoing operations are performed, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

With reference to the ninth aspect, in a first possible implementation of the ninth aspect, both the initial security policy and the target security policy define at least one of a key algorithm, a key length, and a key update period.

With reference to the ninth aspect, or the first possible implementation of the ninth aspect, in a second possible implementation of the ninth aspect, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

According to a tenth aspect, an embodiment of the present invention provides a communications system. The communications system includes a session management device, a key management device, and user equipment; the session management device is the session management device according to any possible implementation of the fourth aspect or the session management device according to any possible implementation of the seventh aspect; the key management device is the key management device according to any possible implementation of the fifth aspect or the key management device according to any possible implementation of the eighth aspect; and the user equipment is the user equipment according to any possible implementation of the sixth aspect or the user equipment according to any possible implementation of the ninth aspect.

According to an eleventh aspect, an embodiment of the present invention provides a storage medium. The storage medium is configured to store an instruction, and when the instruction is run on a processor, the method according to any one of the first aspect or the possible implementations of the first aspect, or any one of the second aspect or the possible implementations of the second aspect, or any one of the third aspect or the possible implementations of the third aspect is enabled to be implemented.

The embodiments of the present invention are implemented, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

BRIEF DESCRIPTION OF THE DRAWINGS

The following briefly describes the accompanying drawings required for the background or embodiments.

DETAILED DESCRIPTION OF ILLUSTRATIVE EMBODIMENTS

Figure 1:
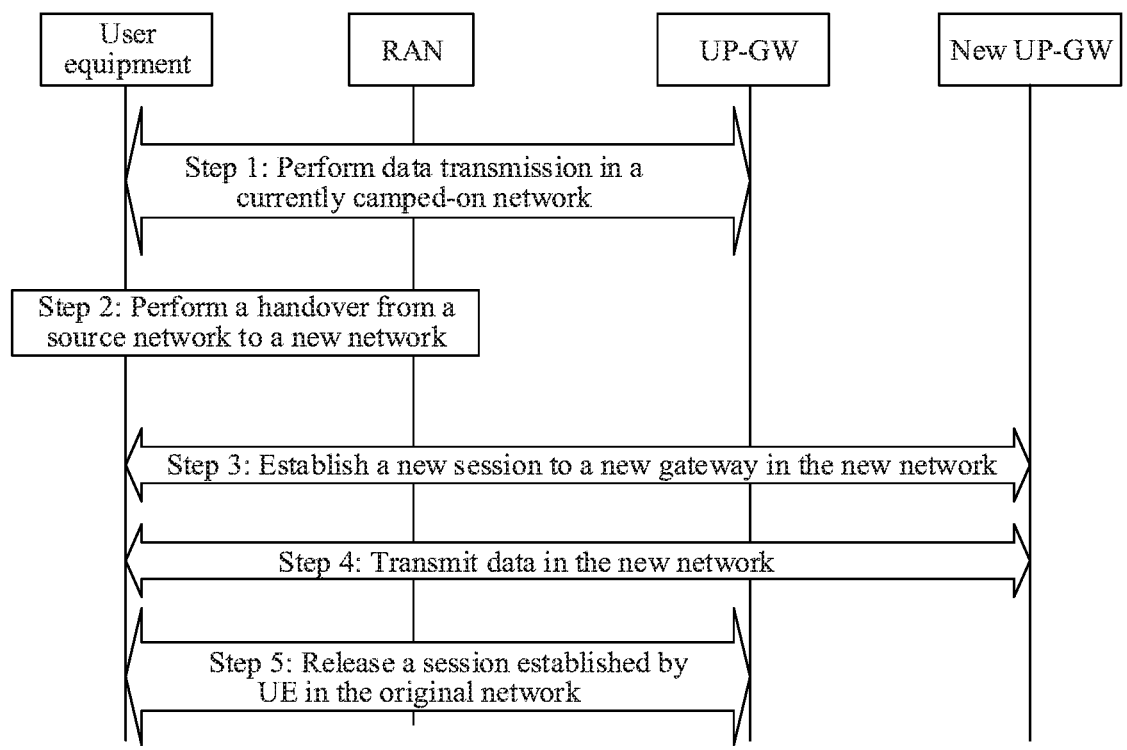
FIG. 1 is a schematic flowchart of a network handover method in the current system.

Embodiments of the present invention are described below with reference to the accompanying drawings, and related terms and network elements that may be used in the embodiments of the present invention are first described.

In the embodiments of the present invention, user equipment is handed over from a network to another network, the network on which the user equipment camps before the handover may be referred to as a "source network", and the network on which the user equipment camps after the handover may be referred to as a "target network".

User equipment (UE): The UE may be an intelligent terminal such as a mobile phone or a smartwatch; or may be a communications device such as a server, a gateway, a base station, or a controller; or may be an Internet of Things (IoT) device such as a sensor, a meter, or a water meter; or may be another device that can access a cellular network.

Mobility management (MM) network element: A physical entity that performs a function of the mobility management network element may be directly referred to as a mobility management device or an MM subsequently.

Session management network element (SM): The session management network element is configured to establish and manage a session, a slice, a flow, or a bearer. A physical entity that performs a function of the session management network element may be referred to as a session management device or an SM subsequently. For ease of distinguishing, if each of the source network and the target network has a session management device, the session management device in the source network may be referred to as a source session management device, and the session management device in the target network may be referred to as a target session management device.

Key management system (KMS): The KMS is responsible for key generation, management, and negotiation, and supports legal listening. The KMS may be separately deployed as an independent logic functional entity, or may be integrated into a device such as an MM or an SM. A physical entity that performs a function of the key management center may be referred to as a key management device subsequently. Generally, the KMS is an authentication unit in a network. A physical entity that performs a function of the authentication unit may be referred to as a key management device or a Control Plane-Authentication Unit (CP-AU) subsequently. For ease of distinguishing, a key management device in the source network may also be referred to as a source key management device, and a key management device in the target network may also be referred to as a target key management device.

Security policy function (PCF): The security policy function is configured to manage a security policy in a network. Each of the source network and the target network may have a security policy function, or the source network and the target network may have a same security policy function.

User plane gateway (UP-GW): A user plane gateway is configured to connect to a carrier network and a data network (DN). UE accesses a network by using the user plane gateway. In the embodiments of the present invention, a gateway that is used by the UE for accessing the source network may be referred to as a source gateway (which may be represented as a "source UP-GW" or a "source GW"), and a gateway used by the UE for accessing the target network may be referred to as a target gateway (which may be represented as a "target UP-GW" or a "target GW").

Figure 2A:
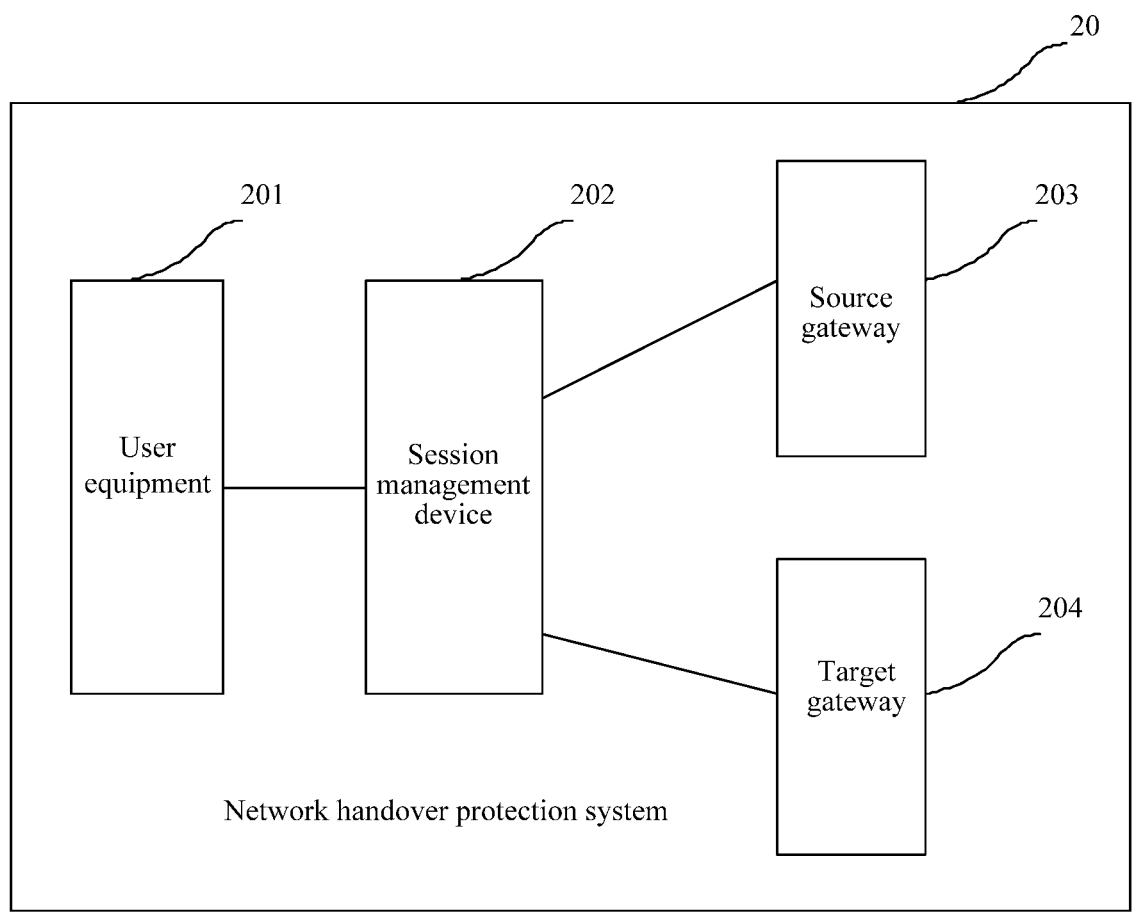
FIG. 2A is a schematic structural diagram of a network handover protection system according to an embodiment of the present invention.

FIG. 2A is a schematic structural diagram of a network handover protection system 20 according to an embodiment of the present invention. The system 20 includes user equipment UE 201, a session management device SM 202, a source gateway GW 203, and a target gateway GW 204. The system 20 may further include another network element such as an access network (AN) device, a security policy function, or a key management device. It should be noted that whether the session management device 202 is a source session management device or a target device is not clarified herein. Therefore, there are two cases: Case 1: The system 20 includes two devices: a source session management device and a target session management device. The source session management device and the target session management device belong to the session management device based on functions. Therefore, both the source session management device and the target session management device are described by using the session management device 202. Case 2: The source session management device and the target session management device are a same device, and the same device is described as the session management device 202. It may be understood that in the embodiments of the present invention, for a device such as the key management device KMS or a CP-AU, there may also be two cases similar to those of the session management device 202.

Figure 2B:
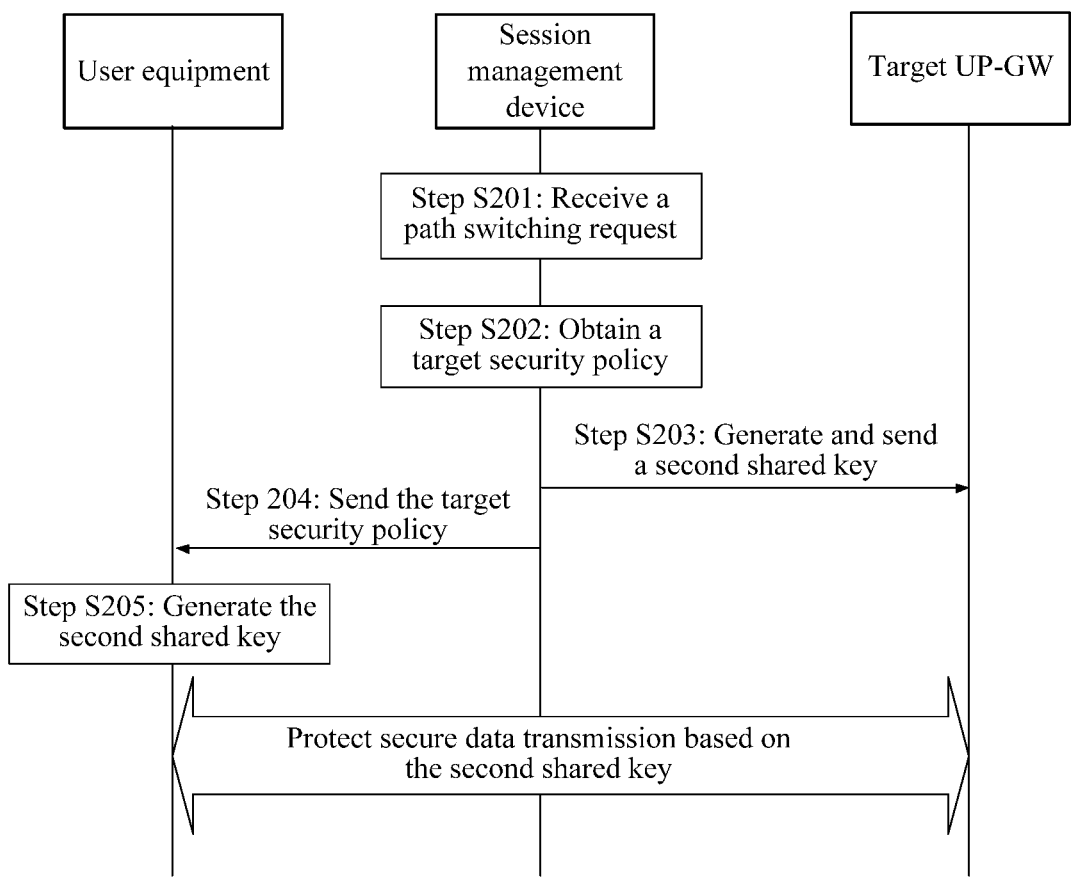
FIG. 2B is a schematic flowchart of a network handover protection method according to an embodiment of the present invention.

FIG. 2B shows a network handover protection method according to an embodiment of the present invention. The method may be implemented based on the system architecture shown in FIG. 2A. The method includes but is not limited to the following steps.

Step S201: The session management device receives a path switching request used to request to hand over the user equipment UE from a source network to a target network.

Specifically, when the UE is handed over from the source network on which the UE originally camps to the target network, the UE interacts with a mobility management MM device in the source network, a mobility management MM device in the target network, and a related access network AN, to prepare a network handover.

Optionally, in addition to the MM, a device that sends the path switching request to the session management device may be further a device such as the UE, a target UP-GW, an application server (APP Server) providing a service, or an application server controller (APP server controller). A message sent to the session management device may also be referred to as a path update request, a session re-establishment request, or another request related to path switching of the UE.

The path switching request (which may also be referred to as a UE location change request) may be sent by the mobility management MM device in the target network to the session management device. The path switching request may include information such as a UE identifier UE ID and an access network AN device identifier AN ID in the target network. The UE ID is information for distinguishing the UE from another device within a range, for example, a Media Access Control (MAC) address, an Internet Protocol (IP) address, a mobile number, an international mobile equipment identity (IMEI), an international mobile subscriber identity (IMSI), an IP multimedia private identity (IMPI), a temporary mobile subscriber identity (TMSI), an IP multimedia public identity (IMPU), and a globally unique temporary UE identity (GUTI) of the UE. The AN ID is information for distinguishing the AN device from another device in the target network within a range, for example, information such as a MAC address or an IP address of the AN device.

Step S202: The session management device obtains a target security policy based on the path switching request.

Specifically, when the UE accesses a network, a shared key is required to perform end-to-end protection on secure data transmission. End-to-end specifically means from the UE to a user plane gateway UP-GW of the network on which the UE camps. When the UE is in different networks, due to a session change, shared keys required for protecting secure data transmission are basically different. In this embodiment of the present invention, a shared key used by the UE to protect secure data transmission in the source network is referred to as a first shared key. A shared key generated through two-way authentication between the UE and the source network may be referred to as a base key. An end-to-end session protection key further generated based on the base key may be referred to as a reference shared key. The first shared key is the base key or the reference shared key or a key derived based on the key generated through two-way authentication between the UE and the source network.

The reference shared key needs to be generated by referring to an initial security policy. If the UE needs to be handed over to the target network, the UE also needs a shared key used to perform end-to-end protection on secure data transmission in the target network. For ease of description, the shared key may be referred to as a second shared key. The second shared key also needs to be generated by referring to a security policy (it is not excluded that the second shared key is the first shared key). The security policy may be the initial security policy, or may be a new security policy obtained by processing the initial security policy by using a preset algorithm. For ease of description, the security policy may be referred to as the target security policy.

Both the initial security policy and the target security policy belong to the security policy. The security policy includes information such as a key algorithm, a key length, or a key update period. For example, a common key algorithm is null, Snow 3G, ZUC, AES, or the like. A common key length is 64 bits, 128 bits, 256 bits, or the like. A common key update time is 6 hours, 12 hours, 1 day, 2 days, or the like. In this embodiment of the present invention, each network element may have a security requirement of the network element. The security requirement represents a key algorithm, a key length, and a key update period, and the like that are acceptable by the network element. A solution that can satisfy a key algorithm, a key length, and a key update period that are required by each network element in a related network element and that is obtained based on a security requirement of the related network element is the security policy described in this embodiment of the present invention. The related network element (such as a key management network element or a mobility management network element) is specifically at least one network element related to data transmission of the UE in the network. When the UE is handed over from the source network to the target network, a user plane gateway required by the UE for accessing the network is changed from a source UP-GW into a target UP-GW. Therefore, it is better generating a new security policy to cover a security requirement of the target UP-GW. When another network element is used, a security requirement of the another network element may further be covered.

In this embodiment of the present invention, a process of obtaining a security policy by processing the initial security policy according to a preset rule is generally as follows. The initial security policy is processed, so that the security policy obtained by processing the initial security policy can satisfy a security requirement of a new related network element. The initial security policy may be prestored in the session management device or may be prestored in another device (such as the target UP-GW or the security policy function). When the original session management device is stored in the another device, the session management device may send a request message for requesting the initial security policy to the another device. The request message may include the UE identifier UE ID, so that the another device searches, based on the UE ID in the request message, for the initial security policy corresponding to the UE (a correspondence between the UE and the first shared key further exists). For example, the foregoing network handover system further includes the security policy function, and the security policy function stores security policies corresponding to some devices. The session management device may send a request message to the security policy function to request the initial security policy corresponding to the UE.

When the target security policy is obtained by processing the initial security policy according to the preset rule, there are a plurality of manners of obtaining the target security policy by the session management device. In an optional solution, the session management device obtains the target security policy by processing the initial security policy according to the preset rule. In another optional solution, the session management device sends the initial security policy to another device (such as the security policy function), the another device obtains the target security policy by processing the initial security policy according to the preset rule, and then the session management device receives the target security policy sent by the another device.

Step S203: The session management device obtains a second shared key generated based on a first shared key and the target security policy, and sends the second shared key to the target gateway; or sends the target security policy and the pre-obtained first shared key to the target gateway, so that the target gateway generates the second shared key based on the first shared key and the target security policy. The target gateway is a gateway of the target network.

Specifically, the second shared key in this embodiment of the present invention is used by the UE to protect secure data transmission in the target network. Therefore, the UE and the gateway (namely, the target gateway) in the target network need to share the second shared key. The target gateway may generate the second shared key, or may receive the second shared key sent by the session management device. For the generation of the second shared key, refer to the first shared key and the target security policy. When the second shared key is generated by the target gateway, the first shared key and the target security policy that are used by the target gateway may be sent by the session management device to the target gateway. When the second shared key of the target gateway is sent by the session management device, the second shared key in the session management device may be generated by the session management device, or may be generated by a key management device (which may be referred to as a "target key management device" for ease of description) in the target network and then sent to the session management device. The target key management device is configured to manage a shared key that is of each user equipment accessing the target network and that is used to perform end-to-end protection on secure data transmission, and the target key management device may be a CP-AU in the target network.

When the second shared key is generated by the session management device, the session management device may pre-send a request to a key management device in the source network, to request the first shared key of the UE. The key management device (namely, a device that manages a key in the source network) in the source network may be referred to as a source key management device. Alternatively, the session management device may store the first shared key. The source key management device is configured to manage a shared key that is of each user equipment accessing the source network and that is used to perform end-to-end protection on secure data transmission, and the source key management device may be a CP-AU in the source network.

When the second shared key is generated by the target key management device and then sent to the session management device, the target security policy used by the target key management device may be sent by the session management device, and the used first shared key may be sent by the session management device to the target key management device, or may be sent by the source key management device to the target key management device.

It should be noted that in this embodiment of the present invention, the source key management device and the target key management device may be a same device, to be specific, the source network and the target network share a same key management device. In this case, if the second shared key is generated by the target key management device, the source key management device may not send the first shared key to the session management device to forward the first shared key to the target key management device.

Step S204: The session management device sends the target security policy to the UE.

Step S205: The UE receives the target security policy and generates the second shared key based on the first shared key and the target security policy. Alternatively, the second shared key may be already sent in step S204, and in this case, the second shared key does not need to be generated again in step S205.

Specifically, the first shared key is used by the UE to protect secure data transmission in the source network. Therefore, the UE already has the first shared key, and after receiving the target security policy, the UE may generate the second shared key based on the first shared key and the target security policy. For example, the target shared key K_sup2 is equal to KDF (K_up, New E2E Policy Set, (at least one of the UE ID, an encryption identifier, a slice identifier, a network identifier, a service parameter, time1, nonce1, and a sequence number)), where K_up is the first shared key, and New E2E Policy Set is the target security policy. The formula indicates that in addition to the first shared key K_up and the target security policy New E2E Policy Set, the at least one of the UE ID, the encryption identifier, the slice identifier, the network identifier, the service parameter, time1, nonce1, and the sequence number further needs to be considered for the generation of the second shared key K_sup2. In addition, the encryption identifier may be a character string, used to identify that a derivation result is an encryption key. nonce1 is a random parameter and may be sent by the key management device to the UE. An objective of performing calculation by using the random number nonce1 is to improve key security and randomicity. Alternatively, key derivation includes at least one of two nonces, one nonce is sent to the UE by the key management device KMS or another device, and the other nonce is generated by the UE. Finally, both the UE and the target gateway have the second shared key. Therefore, the UE may use the second shared key as a shared key used to perform end-to-end protection on secure data transmission between the UE and the target gateway. After the foregoing procedure is performed, reverse data transmission is performed between the source gateway and the target gateway, thereby ensuring service continuity of the UE. Generally, in addition to the target security policy and the first shared key, generating the second shared key by the UE further needs to use other parameters, such as a fresh parameter nonce, a key algorithm identifier, and a session identifier. These parameters may be sent to the UE by the session management device or a related network element.

The session management device in the foregoing solution may be a device or may be a type of device. When the session management device is a type of device, the session management device includes a source session management device and a target session management device. The source session management device is configured to manage a session of each user equipment in the source network. The target session management device is configured to manage a session of each user equipment in the target network. Descriptions of the foregoing steps may be detailed as follows.

The receiving, by the session management device, a path switching request used to request to hand over the user equipment UE from a source network to a target network is specifically: receiving, by the source session management device, the path switching request used to request to hand over the user equipment UE from the source network to the target network. The obtaining, by the session management device, a target security policy based on the path switching request is specifically: obtaining, by the source session management device, the initial security policy, and sending the initial security policy to the target session management device; and obtaining, by the target session management device, the target security policy based on the initial security policy. The obtaining, by the session management device, a second shared key generated based on a first shared key and the target security policy, and sending the second shared key to the target gateway is specifically: obtaining, by the target session management device, the second shared key generated based on the first shared key and the target security policy, and sending the second shared key to the target gateway. The sending, by the session management device, the target security policy to the UE is specifically: sending, by the target session management device, the target security policy to the UE. After the foregoing procedure is performed, the source session management device may perform user plane security context reconfiguration, to clear information about the UE in the source network.

Optionally, the obtaining, by the source session management device, the initial security policy, and sending the initial security policy to the target session management device is specifically: sending a key request message to the source key management device, where the source key management device is configured to manage a shared key that is of each user equipment accessing the source network and that is used to perform end-to-end protection on secure data transmission; and receiving the first shared key sent by the source key management device based on the key request message, and sending the initial security policy to the target session management device.

It should be noted that, an encryption key may be generated based on information such as the first shared key, the target security policy, and an encryption algorithm identifier, or an integrity protection key may be generated based on information such as the first shared key, the target security policy, and an integrity protection algorithm identifier. Both the encryption key and the integrity protection key belong to the second shared key.

The encryption key and the integrity protection key may alternatively be obtained by performing further calculation based on the second shared key. For example, the encryption key K_SID1_enc is equal to KDF (K_sup2, (at least one of the security policy, the encryption algorithm identifier, the UE ID, and the session identifier)), to be specific, the second shared key K_sup2 needs to be considered for the generation of the encryption key, and information such as the security policy, the encryption algorithm identifier, the UE ID, and the session identifier may further be considered in addition to the second shared key K_sup2. The encryption algorithm identifier indicates an encryption algorithm required for generating the encryption key K_SID1_enc. For example, the integrity protection key K_SID1_int is equal to KDF (K_sup2, (at least one of the security policy, the integrity protection algorithm identifier, the UE ID, and the session identifier)), to be specific, the second shared key K_sup2 needs to be considered for the generation of the integrity protection key, and information such as the integrity protection algorithm identifier, the UE ID, and the session identifier may further be considered in addition to the second shared key K_sup2. The integrity protection algorithm identifier indicates an integrity protection algorithm required for generating the integrity protection key K_SID1_int. The integrity protection algorithm may include one or more of the slice identifier, a bearer (bearer) ID, quality of service (English: Quality of Service, QoS for short), a flow (flow) ID, and the like.

The foregoing target security requirement and the foregoing used parameters such as the bearer (bearer) identifier, the flow (flow) identifier, the slice identifier, and the session identifier (session ID) may be carried in a same message together. In addition, the encryption algorithm identifier and the integrity protection algorithm identifier may be content of the target security policy.

To better understand the solutions in the embodiments of the present invention, descriptions are provided below with reference to specific scenarios shown in FIG. 3A to FIG. 3H.

Figure 3A:
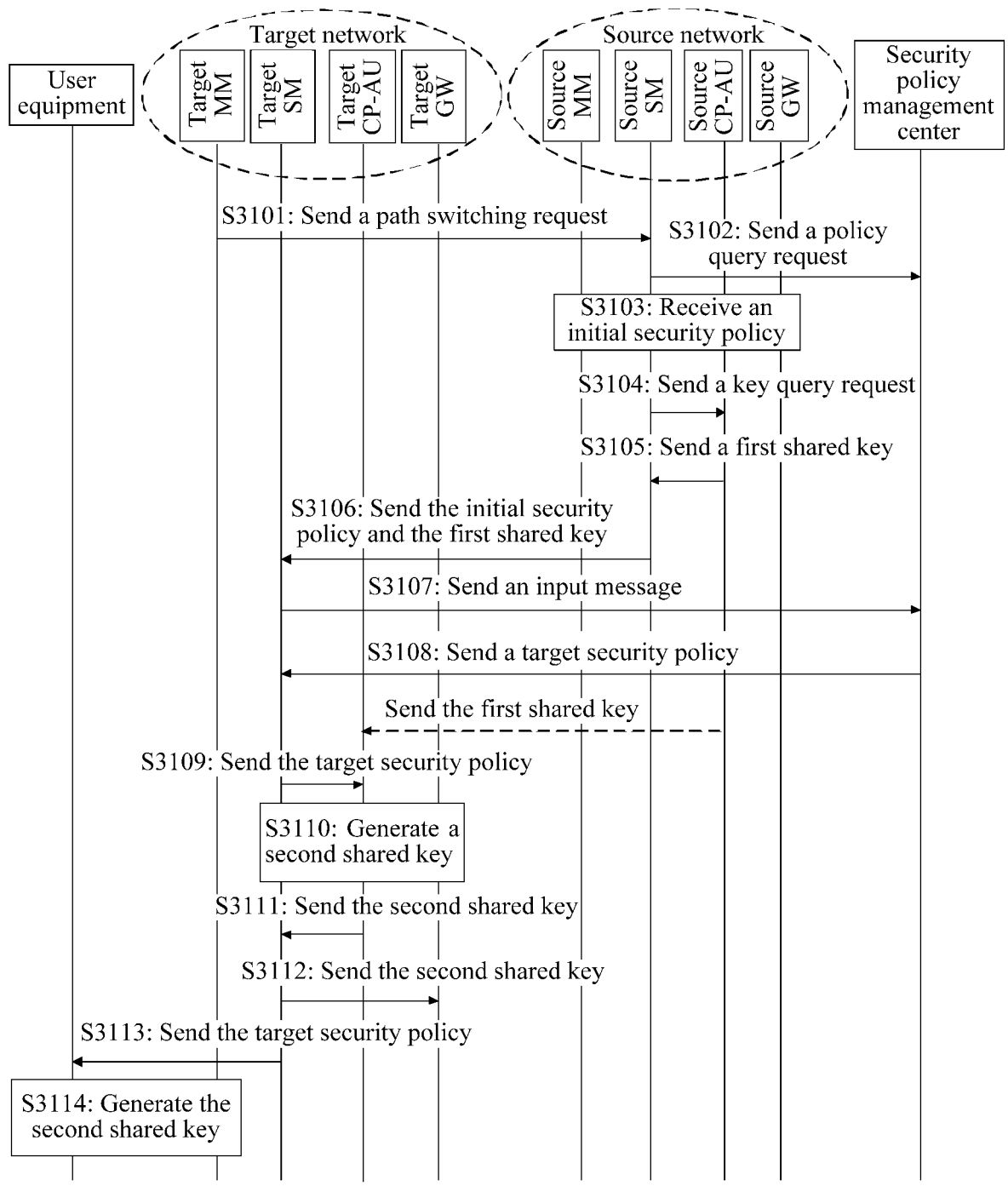
FIG. 3A is a schematic flowchart of another network handover protection method according to an embodiment of the present invention.

FIG. 3A is a schematic flowchart of another network handover protection method according to an embodiment of the present invention. The system 20 shown in FIG. 2A includes user equipment UE, a source session management device SM, a target session management device SM, a source mobility management device MM, a target mobility management device MM, a source CP-AU, a target CP-AU, a source UP-GW, a target UP-GW, and a security policy function. A procedure shown in FIG. 3A needs to be implemented based on the system 20, and the procedure is as follows:

Step S3101: The target MM sends a path switching request to the source SM. The path switching request is used to request to hand over the UE from a source network to a target network, and the path switching request includes information such as a UE identifier UE ID and an address of the target network.

Step S3102: The source SM receives the path switching request and makes a response to the path switching request. A response manner includes: sending a policy query request including the UE ID to the security policy function, where the policy query request is used to request the security policy function to query, based on the UE ID, a security policy corresponding to the UE and feed back the queried security policy to the source SM. Then, the source SM performs a subsequent step. The security policy corresponding to the UE is an initial security policy. Certainly, the source SM may store the initial security policy corresponding to the UE. In this case, the initial security policy may be directly obtained from the source SM rather than the security policy function. Optionally, the source SM may determine whether to update the SM, and if yes, the source SM performs the subsequent step.

Step S3103: The source SM receives the initial security policy sent by the security policy function.

Step S3104: The source SM sends a key query request to the source CP-AU. The key query request is used to request to query a shared key used by the UE to protect secure data transmission in the source network. Certainly, the source SM may alternatively store the shared key used by the UE to perform end-to-end protection on secure data transmission in the source network.

Step S3105: The source CP-AU receives the key query request and makes a response to the key query request to query the shared key, namely, a first shared key, used by the UE to protect secure data transmission in the source network. Then, the source CP-AU sends the first shared key to the source SM, or the source CP-AU may send the first shared key to the target CP-AU, and then the target CP-AU forwards the first shared key to the source SM.

Step S3106: The source SM sends the initial security policy and the first shared key to the target SM. Optionally, the first shared key may alternatively be sent by the source CP-AU to the target CP-AU, and then forwarded by the target CP-AU to the target SM.

Step S3107: The target SM receives the initial security policy and the first shared key, and then sends input information to the security policy function. The input information includes at least the initial security policy.

Step S3108: The security policy function receives the input information, and obtains a new security policy by processing the input information according to a preset rule or obtains the new security policy through negotiation with another device, where the new security policy is a target security policy; and then the security policy function sends the target security policy to the target SM.

Step S3109: The target SM receives the target security policy, and sends the target security policy to the target CP-AU. It may be understood that both the target SM and the target CP-AU may need to store the target security policy.

Step S3110: The target CP-AU receives the target security policy, and generates a second shared key based on the target security policy and the first shared key. It should be noted that the first shared key used by the target CP-AU may be sent by the target SM, or may be sent by the source CP-AU.

Step S3111: The target CP-AU sends the second shared key to the target SM.

Step S3112: The target SM receives the second shared key and sends the second shared key to the target GW.

Step S3113: The target SM sends the target security policy to the UE. Certainly, the target SM may alternatively directly send the second shared key to the UE. In this way, the UE does not perform the subsequent operation of generating the second shared key based on the target security policy and the first shared key.

Step S3114: The UE receives the target security policy, and then generates the second shared key with reference to the target security policy and the first shared key that the UE already has.

Therefore, both the UE and the target UP-GW have the second shared key, so that the UE can perform end-to-end protection on secure data transmission in the target network by using the second shared key or a shared key derived based on the second shared key. It should be noted that after both the UE and the target UP-GW have the second shared key, the devices in the foregoing system may further interact with each other. For example, the target SM instructs the source SM to perform user plane security context reconfiguration, to clear information about previous camping of the UE on the source network. For another example, reverse data transmission is performed between the target UP-GW and the source GW, thereby ensuring continuity of a service of the UE from the source network to the target network. Optionally, before the foregoing session establishment-related steps are performed, the UE may initiate a session (session) re-establishment request to trigger the related steps. In addition, the steps may be performed in the foregoing described order, or not all the steps are performed in the foregoing described order, provided that there is no logical problem.

It should be noted that the target security policy may alternatively be the initial security policy. In this case, the foregoing step of generating the target security policy based on the initial security policy does not exist. Optionally, when the initial security policy is the target security policy, both the target security policy and the first shared key that are required for generating the second shared key exist in the source network. Therefore, in step S3106, the source SM does not need to send the first shared key and the initial security policy to the target SM, but sends the initial security policy to the source CP-AU, so that the source CP-AU generates the second shared key based on the first shared key and the initial security policy. Then, the source CP-AU sends the second shared key to the source SM, the source SM forwards the second shared key to the target SM, and finally the target SM forwards the second shared key to the target UP-GW. To be specific, a difference between the possibility and the solution of steps S3101 to S3114 lies in that, the second shared key used by the target UP-GW is generated by the source CP-AU rather than the target CP-AU.

Figure 3B:
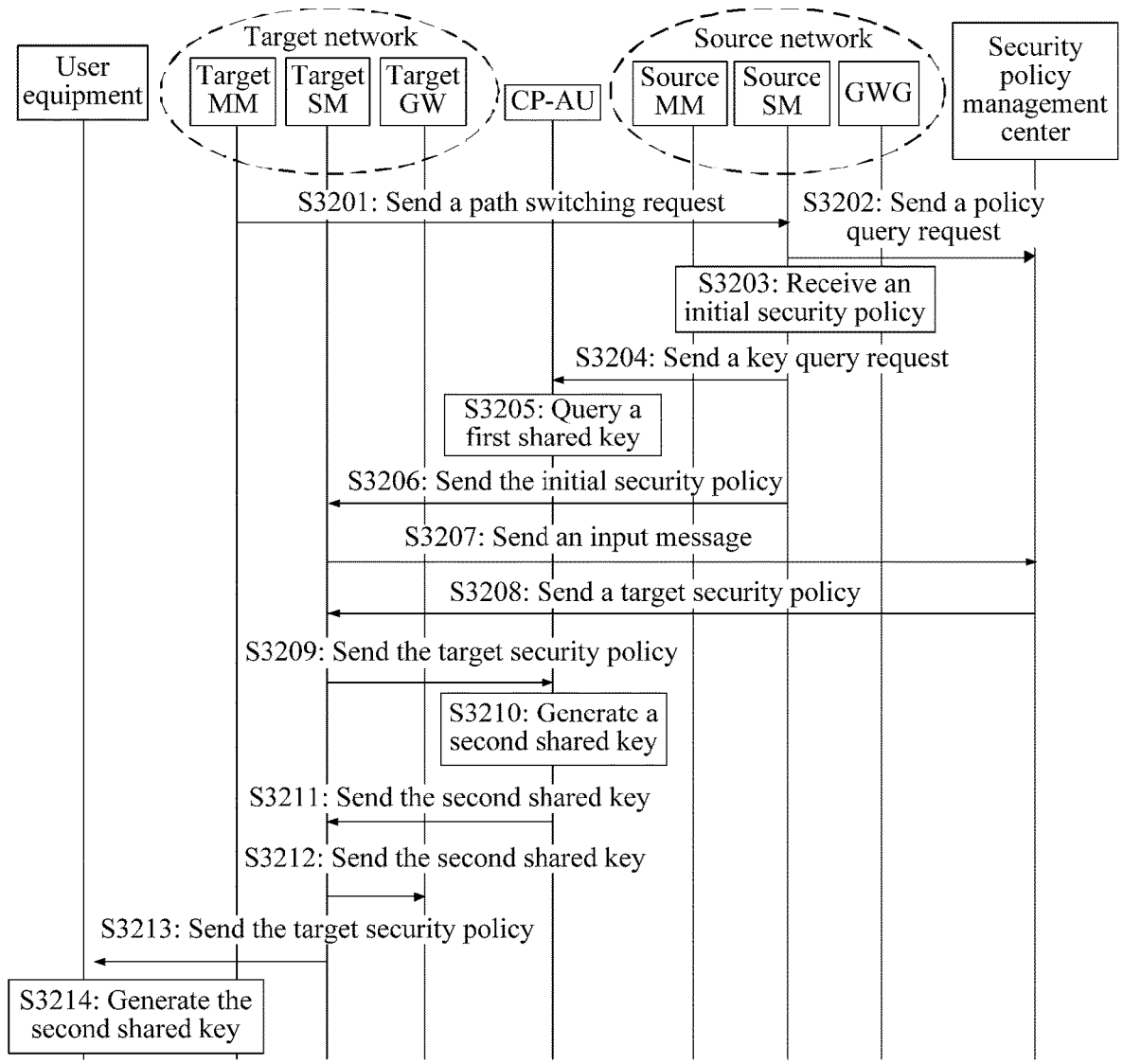
FIG. 3B is a schematic flowchart of another network handover protection method according to an embodiment of the present invention.

FIG. 3B is a schematic flowchart of another network handover protection method according to an embodiment of the present invention. The system 20 shown in FIG. 2A includes user equipment UE, a source session management device SM, a target session management device SM, a source mobility management device MM, a target mobility management device MM, a CP-AU, a source UP-GW, a target UP-GW, and a security policy function. The target network and the source network include the same CP-AU. A procedure shown in FIG. 3B needs to be implemented based on the system 20, and the procedure is as follows:

Step S3201: The target MM sends a path switching request to the source SM. The path switching request is used to request to hand over the UE from the source network to the target network, and the path switching request includes information such as a UE identifier UE ID and an address of the target network.

Step S3202: The source SM receives the path switching request and makes a response to the path switching request. A response manner includes: sending a policy query request including the UE ID to the security policy function, where the policy query request is used to request the security policy function to query, based on the UE ID, a security policy corresponding to the UE and feed back the queried security policy to the source SM. Then, the source SM performs a subsequent step. The security policy corresponding to the UE is an initial security policy. Certainly, the source SM may store the initial security policy corresponding to the UE. In this case, the initial security policy may be directly obtained from the source SM rather than the security policy function. Optionally, the source SM may determine whether to update the SM, and if yes, the source SM performs the subsequent step.

Step S3203: The source SM receives the initial security policy sent by the security policy function.

Step S3204: The source SM sends a key query request to the CP-AU. The key query request is used to request to query a shared key used by the UE to protect secure data transmission in the source network. Certainly, the source SM may alternatively store the shared key used by the UE to perform end-to-end protection on secure data transmission in the source network.

Step S3205: The CP-AU receives the key query request and makes a response to the key query request to query the shared key, namely, a first shared key, used by the UE to protect secure data transmission in the source network.

Step S3206: The source SM sends the initial security policy to the target SM.

Step S3207: The target SM receives the initial security policy, and then sends input information to the security policy function. The input information includes at least the initial security policy.

Step S3208: The security policy function receives the input information, and obtains a new security policy by processing the input information according to a preset rule, where the new security policy is a target security policy; and then the security policy function sends the target security policy to the target SM.

Step S3209: The target SM receives the target security policy, and sends the target security policy to the CP-AU. It may be understood that both the target SM and the CP-AU may need to store the target security policy.

Step S3210: The CP-AU receives the target security policy, and generates a second shared key based on the target security policy and the first shared key.

Step S3211: The CP-AU sends the second shared key to the target SM.

Step S3212: The target SM receives the second shared key and sends the second shared key to the target UP-GW.

Step S3213: The target SM sends the target security policy to the UE. Certainly, the target SM may alternatively directly send the second shared key to the UE. In this way, the UE does not perform the subsequent operation of generating the second shared key based on the target security policy and the first shared key.

Step S3214: The UE receives the target security policy, and then generates the second shared key with reference to the target security policy and the first shared key that the UE already has.

Therefore, both the UE and the target UP-GW have the second shared key, so that the UE can perform end-to-end protection on secure data transmission in the target network by using the second shared key or a shared key derived based on the second shared key. It should be noted that after both the UE and the target UP-GW have the second shared key, the devices in the foregoing system may further interact with each other. For example, the target SM instructs the source SM to perform user plane security context reconfiguration, to clear information about previous camping of the UE on the source network. For another example, reverse data transmission is performed between the target UP-GW and the source GW, thereby ensuring continuity of a service of the UE from the source network to the target network. Optionally, before the foregoing session establishment-related steps are performed, the UE may initiate a session re-establishment request to trigger the related steps. In addition, the steps may be performed in the foregoing described order, or not all the steps are performed in the foregoing described order, provided that there is no logical problem.

It should be noted that the target security policy may alternatively be the initial security policy. In this case, the foregoing step of generating the target security policy based on the initial security policy does not exist. Optionally, when the initial security policy is the target security policy, both the target security policy and the first shared key that are required for generating the second shared key exist in the source network. Therefore, in step S3206, the source SM does not need to send the initial security policy to the target SM, but sends the initial security policy to the CP-AU, so that the CP-AU generates the second shared key based on the first shared key and the initial security policy. Then, the CP-AU sends the second shared key to the target SM, and the target SM forwards the second shared key to the target UP-GW. To be specific, a difference between the possibility and the solution of steps S3201 to S3214 lies in that, the CP-AU is triggered by the source SM, not by the target SM, to generate the second shared key used by the target UP-GW.

Figure 3C:
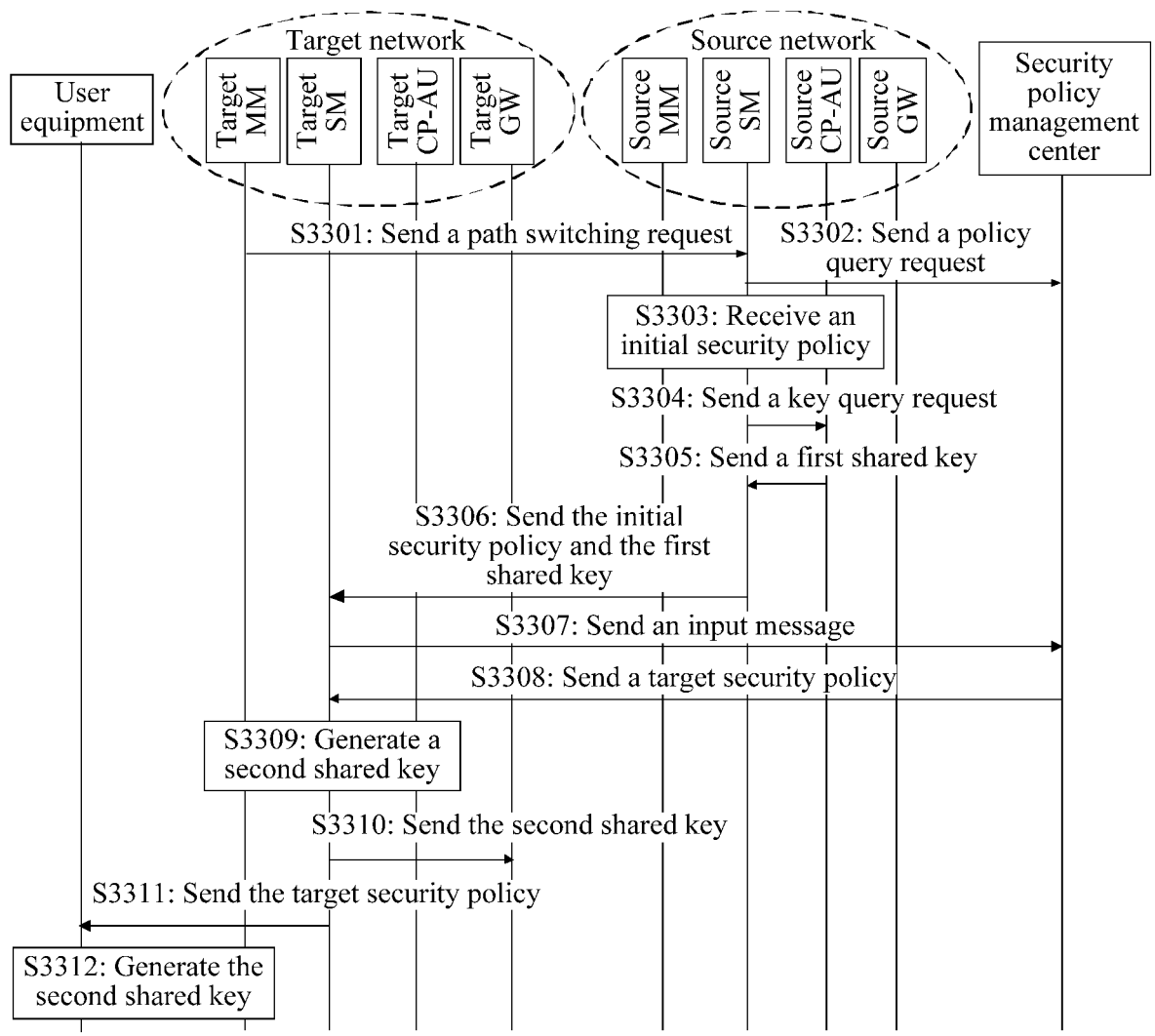
FIG. 3C is a schematic flowchart of another network handover protection method according to an embodiment of the present invention.

FIG. 3C is a schematic flowchart of another network handover protection method according to an embodiment of the present invention. The system 20 shown in FIG. 2A includes user equipment UE, a source session management device SM, a target session management device SM, a source mobility management device MM, a target mobility management MM device, a source CP-AU, a target CP-AU, a source UP-GW, a target UP-GW, and a security policy function. A procedure shown in FIG. 3C needs to be implemented based on the system 20, and the procedure is as follows:

Step S3301: The target MM sends a path switching request to the source SM. The path switching request is used to request to hand over the UE from a source network to a target network, and the path switching request includes information such as a UE identifier UE ID and an address of the target network.

Step S3302: The source SM receives the path switching request and makes a response to the path switching request. A response manner includes: sending a policy query request including the UE ID to the security policy function, where the policy query request is used to request the security policy function to query, based on the UE ID, a security policy corresponding to the UE and feed back the queried security policy to the source SM. Then, the source SM performs a subsequent step. The security policy corresponding to the UE is an initial security policy. Certainly, the source SM may store the initial security policy corresponding to the UE. In this case, the initial security policy may be directly obtained from the source SM rather than the security policy function. Optionally, the source SM may determine whether to update the SM, and if yes, the source SM performs the subsequent step.

Step S3303: The source SM receives the initial security policy sent by the security policy function.

Step S3304: The source SM sends a key query request to the source CP-AU. The key query request is used to request to query a shared key used by the UE to protect secure data transmission in the source network. Certainly, the source SM may alternatively store the shared key used by the UE to perform end-to-end protection on secure data transmission in the source network.

Step S3305: The source CP-AU receives the key query request and makes a response to the key query request to query the shared key, namely, a first shared key, used by the UE to protect secure data transmission in the source network. Then, the source CP-AU sends the first shared key to the source SM, or the source CP-AU may send the first shared key to the target CP-AU, and then the target CP-AU forwards the first shared key to the source SM.

Step S3306: The source SM sends the initial security policy and the first shared key to the target SM. Optionally, the first shared key may alternatively be sent by the source CP-AU to the target CP-AU, and then forwarded by the target CP-AU to the target SM. Optionally, the first shared key sent by the source SM may be derived by the source SM based on information such as a random number or a sequence number.

Step S3307: The target SM receives the initial security policy and the first shared key, and then sends input information to the security policy function. The input information includes at least the initial security policy.

Step S3308: The security policy function receives the input information, and obtains a new security policy by processing the input information according to a preset rule, where the new security policy is a target security policy; and then the security policy function sends the target security policy to the target SM.

Step S3309: The target SM receives the target security policy, and generates a second shared key based on the target security policy and the first shared key.

Step S3310: The target SM sends the second shared key to the target UP-GW.

Step S3311: The target SM sends the target security policy to the UE. Certainly, the target SM may alternatively directly send the second shared key to the UE. In this way, the UE does not perform the subsequent operation of generating the second shared key based on the target security policy and the first shared key.

Step S3312: The UE receives the target security policy, and then generates the second shared key with reference to the target security policy and the first shared key that the UE already has.

Therefore, both the UE and the target UP-GW have the second shared key, so that the UE can perform end-to-end protection on secure data transmission in the target network by using the second shared key or a shared key derived based on the second shared key. It should be noted that after both the UE and the target UP-GW have the second shared key, the devices in the foregoing system may further interact with each other. For example, the target SM instructs the source SM to perform user plane security context reconfiguration, to clear information about previous camping of the UE on the source network. For another example, reverse data transmission is performed between the target UP-GW and the source GW, thereby ensuring continuity of a service of the UE from the source network to the target network. Optionally, before the foregoing session establishment-related steps are performed, the UE may initiate a session re-establishment request to trigger the related steps. In addition, the steps may be performed in the foregoing described order, or not all the steps are performed in the foregoing described order, provided that there is no logical problem.

It should be noted that the target security policy may alternatively be the initial security policy. In this case, the foregoing step of generating the target security policy based on the initial security policy does not exist. Optionally, when the initial security policy is the target security policy, both the target security policy and the first shared key that are required for generating the second shared key exist in the source network. Therefore, in step S3306, the source SM does not need to send the initial security policy and the first shared key to the target SM, but directly generates the second shared key based on the first shared key and the initial security policy, and then sends the second shared key to the target UP-GW. To be specific, a difference between the possibility and the solution of steps S3301 to S3314 lies in that, the second shared key used by the target UP-GW is generated by the source CP-AU rather than the target SM.

Figure 3D:
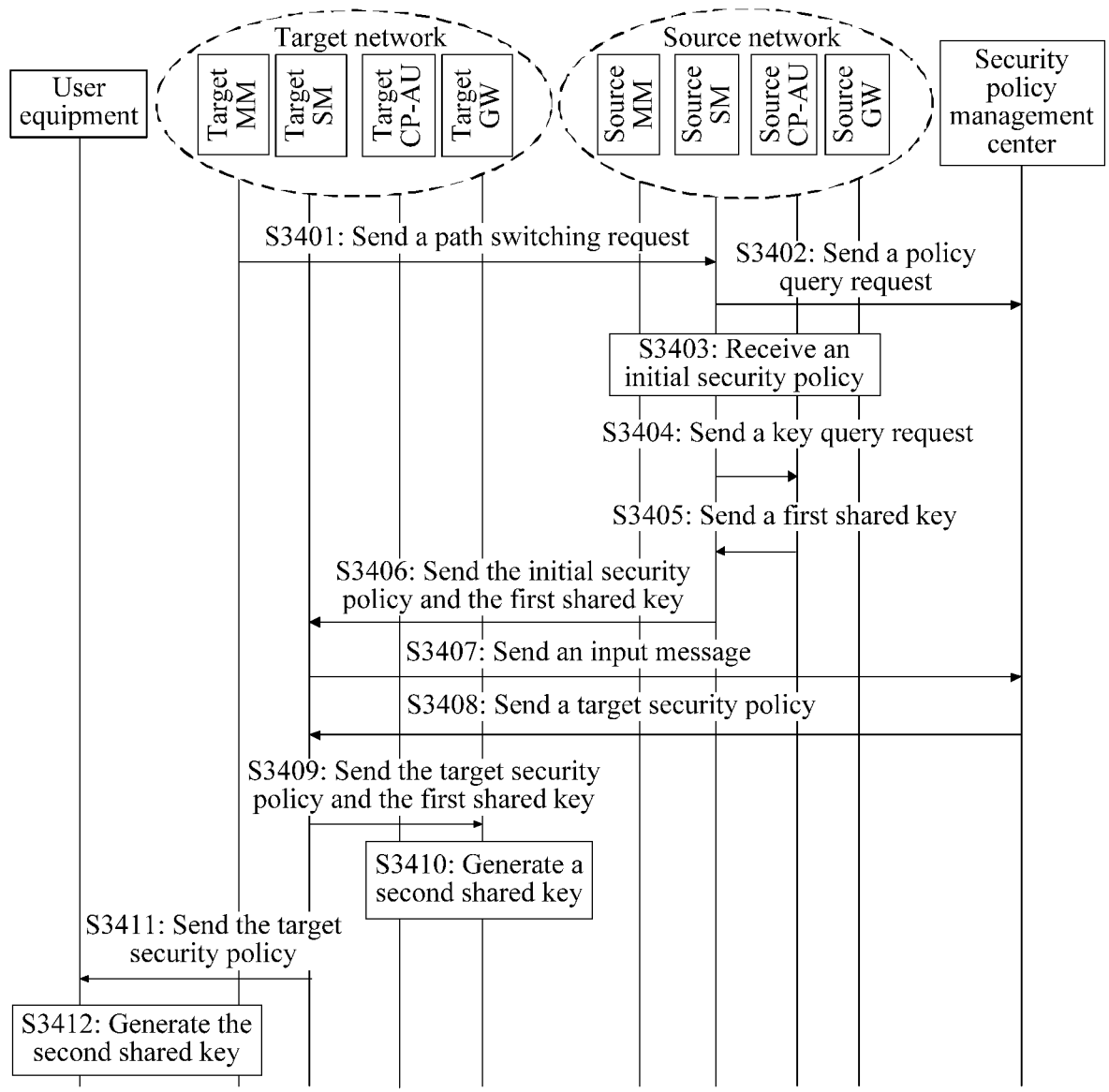
FIG. 3D is a schematic flowchart of another network handover protection method according to an embodiment of the present invention.

FIG. 3D is a schematic flowchart of another network handover protection method according to an embodiment of the present invention. The system 20 shown in FIG. 2A includes user equipment UE, a source session management device SM, a target session management device SM, a source mobility management device MM, a target mobility management device MM, a source CP-AU, a target CP-AU, a source UP-GW, a target UP-GW, and a security policy function. A procedure shown in FIG. 3D needs to be implemented based on the system 20, and the procedure is as follows:

Step S3401: The target MM sends a path switching request to the source SM. The path switching request is used to request to hand over the UE from a source network to a target network, and the path switching request includes information such as a UE identifier UE ID and an address of the target network.

Step S3402: The source SM receives the path switching request and makes a response to the path switching request. A response manner includes: sending a policy query request including the UE ID to the security policy function, where the policy query request is used to request the security policy function to query, based on the UE ID, a security policy corresponding to the UE and feed back the queried security policy to the source SM. Then, the source SM performs a subsequent step. The security policy corresponding to the UE is an initial security policy. Certainly, the source SM may store the initial security policy corresponding to the UE. In this case, the initial security policy may be directly obtained from the source SM rather than the security policy function. Optionally, the source SM may determine whether to update the SM, and if yes, the source SM performs the subsequent step.

Step S3403: The source SM receives the initial security policy sent by the security policy function.

Step S3404: The source SM sends a key query request to the source CP-AU. The key query request is used to request to query a shared key used by the UE to protect secure data transmission in the source network. Certainly, the source SM may alternatively store the shared key used by the UE to perform end-to-end protection on secure data transmission in the source network.

Step S3405: The source CP-AU receives the key query request and makes a response to the key query request to query the shared key, namely, a first shared key, used by the UE to protect secure data transmission in the source network. Then, the source CP-AU sends the first shared key to the source SM, or the source CP-AU may send the first shared key to the target CP-AU, and then the target CP-AU forwards the first shared key to the source SM.

Step S3406: The source SM sends the initial security policy and the first shared key to the target SM. Optionally, the first shared key may alternatively be sent by the source CP-AU to the target CP-AU, and then forwarded by the target CP-AU to the target SM. It should be noted that, the first shared key sent by the source SM may be derived by the source SM based on information such as a random number or a sequence number.

Step S3407: The target SM receives the initial security policy and the first shared key, and then sends input information to the security policy function. The input information includes at least the initial security policy.

Step S3408: The security policy function receives the input information, and obtains a new security policy by processing the input information according to a preset rule, where the new security policy is a target security policy; and then the security policy function sends the target security policy to the target SM.

Step S3409: The target SM receives the target security policy, and sends the target security policy and the first shared key to the target UP-GW.

Step S3410: The target UP-GW receives the target security policy and the first shared key, and generates a second shared key based on the target security policy and the first shared key. An occasion on which the target UP-GW generates the second shared key is not limited herein. In an optional solution, the target UP-GW immediately generates the second shared key after receiving the target security policy and the first shared key, so that a to-be-established session (session) can use the second shared key. In another optional solution, the target UP-GW does not generate the second shared key first after receiving the target security policy and the first shared key, to be specific, a to-be-established session (session) still uses the first shared key of the UE in the source network. To be specific, in a very special case, a key of a target session does not need to be updated, but the target security policy still needs to be updated and stored for use in a next handover of the UE. A session established after the second shared key is generated can use the second shared key.

Step S3411: The target SM sends the target security policy to the UE. Certainly, the SM may alternatively directly send the second shared key to the UE. In this way, the UE does not perform the subsequent operation of generating the second shared key based on the target security policy and the first shared key. Optionally, if an end-to-end protection key of a target session does not need to be updated, the target SM sends the first shared key.

Step S3412: The UE receives the target security policy, and then generates the second shared key with reference to the target security policy and the first shared key that the UE already has. It may be understood that, if the second shared key is not immediately generated in step S3410 for the to-be-established session, the UE may not generate the second shared key first, but generates the second shared key when a new session is established subsequently.

Therefore, both the UE and the target UP-GW have the second shared key, so that the UE can protect secure data transmission in the target network by using the second shared key or a shared key derived based on the second shared key. It should be noted that after both the UE and the target UP-GW have the second shared key, the devices in the foregoing system may further interact with each other. For example, the target SM instructs the source SM to perform user plane security context reconfiguration, to clear information about previous camping of the UE on the source network. For another example, reverse data transmission is performed between the target UP-GW and the source GW, thereby ensuring continuity of a service of the UE from the source network to the target network. Optionally, before the foregoing session establishment-related steps are performed, the UE may initiate a session (session) re-establishment request to trigger the related steps. In addition, the steps may be performed in the foregoing described order, or not all the steps are performed in the foregoing described order, provided that there is no logical problem.

It should be noted that the target security policy may alternatively be the initial security policy. In this case, the foregoing step of generating the target security policy based on the initial security policy does not exist. Optionally, when the initial security policy is the target security policy, both the target security policy and the first shared key that are required for generating the second shared key exist in the source network. Therefore, in step S3306, the source SM does not need to send the initial security policy and the first shared key to the target SM, but sends the first shared key and the initial security policy to the source UP-GW. The source UP-GW generates the second shared key based on the first shared key and the initial security policy, and then sends the second shared key to the target UP-GW. To be specific, a difference between the possibility and the solution of steps S3301 to S3312 lies in that, the second shared key used by the target UP-GW is generated by the source UP-GW rather than the target UP-GW. Optionally, the target SM may send a message including the UE ID to the source UP-GW or the target UP-GW may forward the message including the UE ID that is sent by the SM to the source UP-GW, to trigger the UP-GW to obtain, based on the UE ID, the first shared key and the initial security policy that correspond to the UE, and generate the second shared key based on the first shared key and the initial security policy.

Figure 3E:
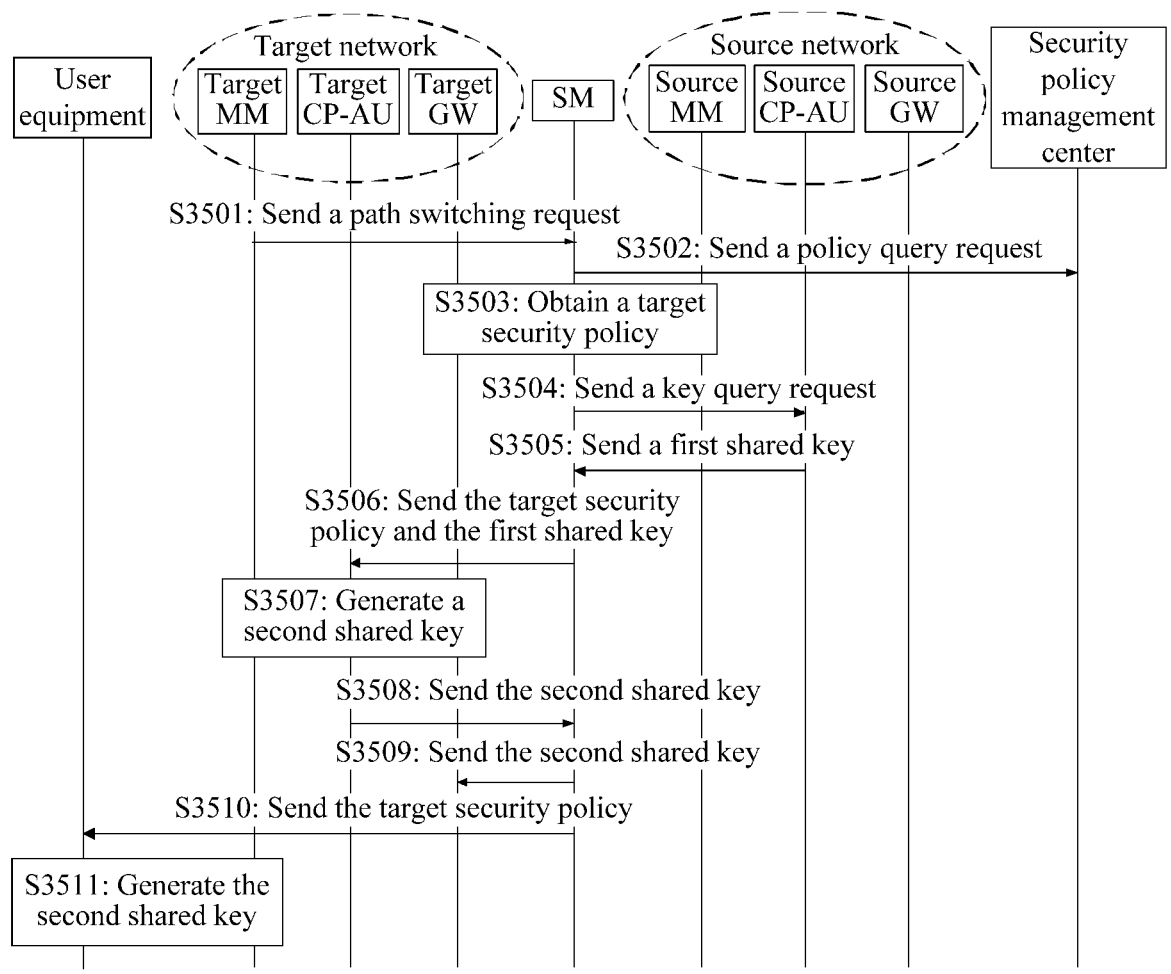
FIG. 3E is a schematic flowchart of another network handover protection method according to an embodiment of the present invention.

FIG. 3E is a schematic flowchart of another network handover protection method according to an embodiment of the present invention. The system 20 shown in FIG. 2A includes user equipment UE, a session management device SM, a source mobility management device MM, a target mobility management device MM, a source CP-AU, a target CP-AU, a source UP-GW, a target UP-GW, and a security policy function. A procedure shown in FIG. 3E needs to be implemented based on the system 20, and the procedure is as follows:

Step S3501: The target MM sends a path switching request to the SM. The path switching request is used to request to hand over the UE from a source network to a target network, and the path switching request includes information such as a UE identifier UE ID and an address of the target network.

Step S3502: The SM receives the path switching request and makes a response to the path switching request. A response manner includes: sending a policy query request including the UE ID to the security policy function, where the policy query request is used to request the security policy function to query, based on the UE ID, a security policy corresponding to the UE and feed back the queried security policy to the SM. Then, the SM performs a subsequent step. The security policy corresponding to the UE is an initial security policy. Certainly, the SM may store the initial security policy corresponding to the UE. In this case, the initial security policy may be directly obtained from the SM rather than the security policy function.

Step S3503: The SM obtains the target security policy. The target security policy is the initial security policy or a security policy generated based on the initial security policy. When the SM stores the initial security policy, the SM may generate the target security policy based on the initial security policy and other information. When the SM does not store the initial security policy, the security policy function may generate the target security policy based on the initial security policy and other information, and send the target security policy to the SM; or the security policy function sends the initial security policy to the SM, and the SM generates the target security policy.

Step S3504: The SM sends a key query request to the source CP-AU. The key query request is used to request to query a shared key used by the UE to protect secure data transmission in the source network. Certainly, the SM may alternatively store the shared key used by the UE to perform end-to-end protection on secure data transmission in the source network.

Step S3505: The source CP-AU receives the key query request and makes a response to the key query request to query the shared key, namely, a first shared key, used by the UE to protect secure data transmission in the source network. Then, the source CP-AU sends the first shared key to the SM, or the source CP-AU may send the first shared key to the target CP-AU, and then the target CP-AU forwards the first shared key to the SM.

Step S3506: The SM sends the target security policy and the first shared key to the target CP-AU. It may be understood that both the SM and the target CP-AU may need to store the target security policy.

Step S3507: The target CP-AU receives the target security policy and the first shared key, and generates a second shared key based on the target security policy and the first shared key. It should be noted that the first shared key used by the target CP-AU may be sent by the SM, or may be sent by the source CP-AU.

Step S3508: The target CP-AU sends the second shared key to the SM.

Step S3509: The SM receives the second shared key and sends the second shared key to the target GW.

Step S3510: The SM sends the target security policy to the UE. Certainly, the SM may alternatively directly send the second shared key to the UE. In this way, the UE does not perform the subsequent operation of generating the second shared key based on the target security policy and the first shared key.

Step S3511: The UE receives the target security policy, and then generates the second shared key with reference to the target security policy and the first shared key that the UE already has.

Therefore, both the UE and the target UP-GW have the second shared key, so that the UE can perform end-to-end protection on secure data transmission in the target network by using the second shared key or a shared key derived based on the second shared key. It should be noted that after both the UE and the target UP-GW have the second shared key, the devices in the foregoing system may further interact with each other. For example, reverse data transmission is performed between the target UP-GW and the source GW, thereby ensuring continuity of a service of the UE from the source network to the target network. Optionally, before the foregoing session establishment-related steps are performed, the UE may initiate a session (session) re-establishment request to trigger the related steps. In addition, the steps may be performed in the foregoing described order, or not all the steps are performed in the foregoing described order, provided that there is no logical problem.

It should be noted that the target security policy may alternatively be the initial security policy. In this case, the foregoing step of generating the target security policy based on the initial security policy does not exist. Optionally, when the initial security policy is the target security policy, both the target security policy and the first shared key that are required for generating the second shared key exist in the source network. Therefore, in step S3506, the SM does not need to send the target security policy to the target CP-AU, but sends the target security policy to the source CP-AU, so that the source CP-AU generates the second shared key based on the first shared key and the initial security policy. Then, the source CP-AU sends the second shared key to the SM, and the SM forwards the second shared key to the target UP-GW. To be specific, a difference between the possibility and the solution of steps S3501 to S3511 lies in that, the second shared key used by the target UP-GW is generated by the source CP-AU rather than the target CP-AU.

Figure 3F:
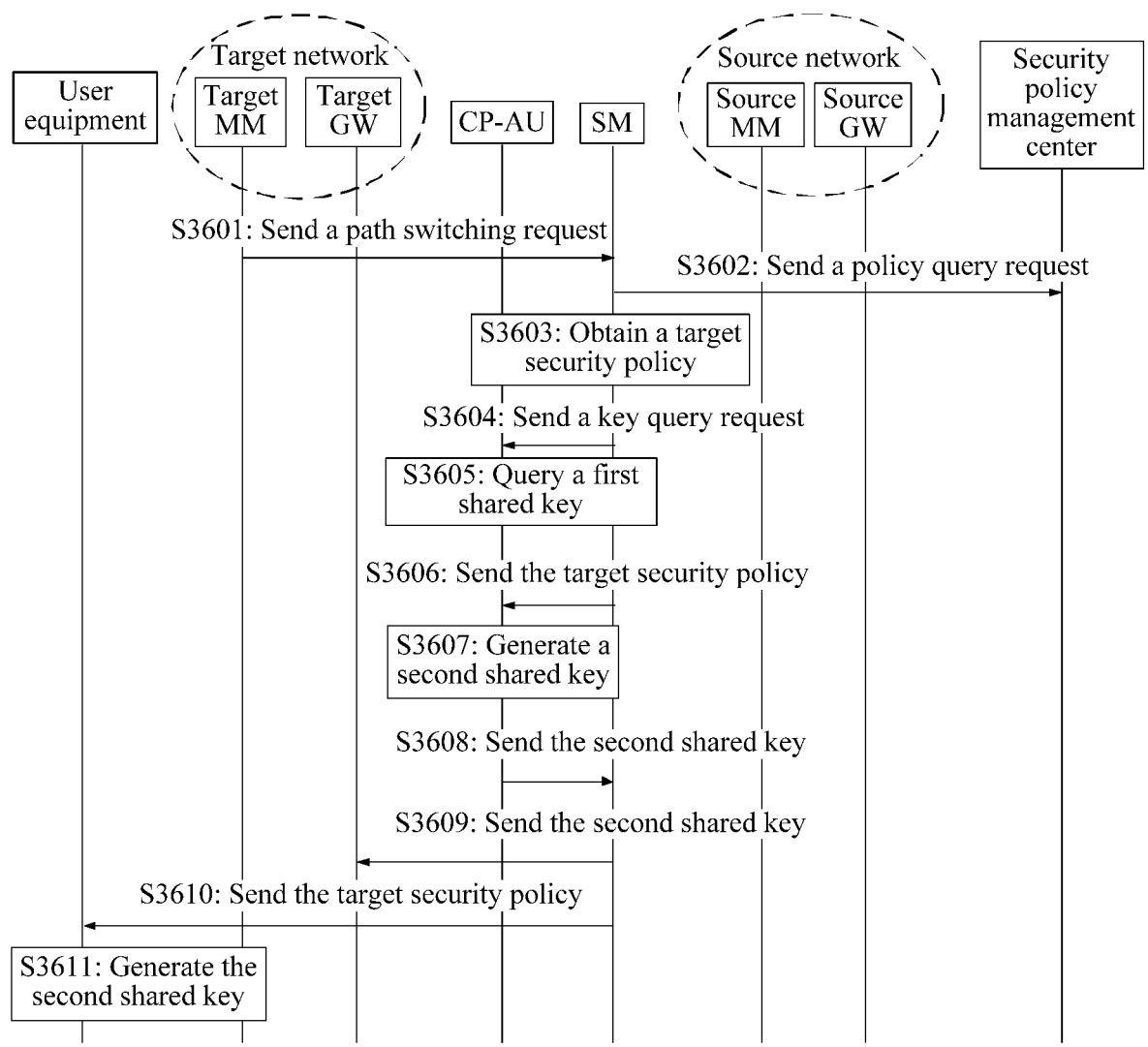
FIG. 3F is a schematic flowchart of another network handover protection method according to an embodiment of the present invention.

FIG. 3F is a schematic flowchart of another network handover protection method according to an embodiment of the present invention. The system 20 shown in FIG. 2A includes user equipment UE, a session management device SM, a source mobility management device MM, a target mobility management device MM, a CP-AU, a source UP-GW, a target UP-GW, and a security policy function. The target network and the source network include the same CP-AU. A procedure shown in FIG. 3F needs to be implemented based on the system 20, and the procedure is as follows:

Step S3601: The target MM sends a path switching request to the SM. The path switching request is used to request to hand over the UE from the source network to the target network, and the path switching request includes information such as a UE identifier UE ID and an address of the target network.

Step S3602: The SM receives the path switching request and makes a response to the path switching request. A response manner includes: sending a policy query request including the UE ID to the security policy function, where the policy query request is used to request the security policy function to query, based on the UE ID, a security policy corresponding to the UE and feed back the queried security policy to the SM. Then, the SM performs a subsequent step. The security policy corresponding to the UE is an initial security policy. Certainly, the SM may store the initial security policy corresponding to the UE. In this case, the initial security policy may be directly obtained from the SM rather than the security policy function.

Step S3603: The SM obtains the target security policy. The target security policy is the initial security policy or a security policy generated based on the initial security policy. When the SM stores the initial security policy, the SM may generate the target security policy based on the initial security policy and other information. When the SM does not store the initial security policy, the security policy function may generate the target security policy based on the initial security policy and other information, and send the target security policy to the SM; or the security policy function sends the initial security policy to the SM, and the SM generates the target security policy.

Step S3604: The SM sends a key query request to the CP-AU. The key query request is used to request to query a shared key used by the UE to protect secure data transmission in the source network. Certainly, the SM may alternatively store the shared key used by the UE to perform end-to-end protection on secure data transmission in the source network.

Step S3605: The CP-AU receives the key query request and makes a response to the key query request to query the shared key, namely, a first shared key, used by the UE to protect secure data transmission in the source network.

Step S3606: The SM sends the target security policy to the CP-AU. It may be understood that both the SM and the CP-AU may need to store the target security policy.

Step S3607: The CP-AU receives the target security policy, and generates a second shared key based on the target security policy and the first shared key.

Step S3608: The CP-AU sends the second shared key to the SM.

Step S3609: The SM receives the second shared key and sends the second shared key to the target UP-GW.

Step S3610: The SM sends the target security policy to the UE. Certainly, the SM may alternatively directly send the second shared key to the UE. In this way, the UE does not perform the subsequent operation of generating the second shared key based on the target security policy and the first shared key.

Step S3611: The UE receives the target security policy, and then generates the second shared key with reference to the target security policy and the first shared key that the UE already has.

Therefore, both the UE and the target UP-GW have the second shared key, so that the UE can perform end-to-end protection on secure data transmission in the target network by using the second shared key or a shared key derived based on the second shared key. It should be noted that after both the UE and the target UP-GW have the second shared key, the devices in the foregoing system may further interact with each other. For example, reverse data transmission is performed between the target UP-GW and the source GW, thereby ensuring continuity of a service of the UE from the source network to the target network. Optionally, before the foregoing session establishment-related steps are performed, the UE may initiate a session (session) re-establishment request to trigger the related steps. In addition, the steps may be performed in the foregoing described order, or not all the steps are performed in the foregoing described order, provided that there is no logical problem.

It should be noted that the target security policy may alternatively be the initial security policy. In this case, the foregoing step of generating the target security policy based on the initial security policy does not exist.

Figure 3G:
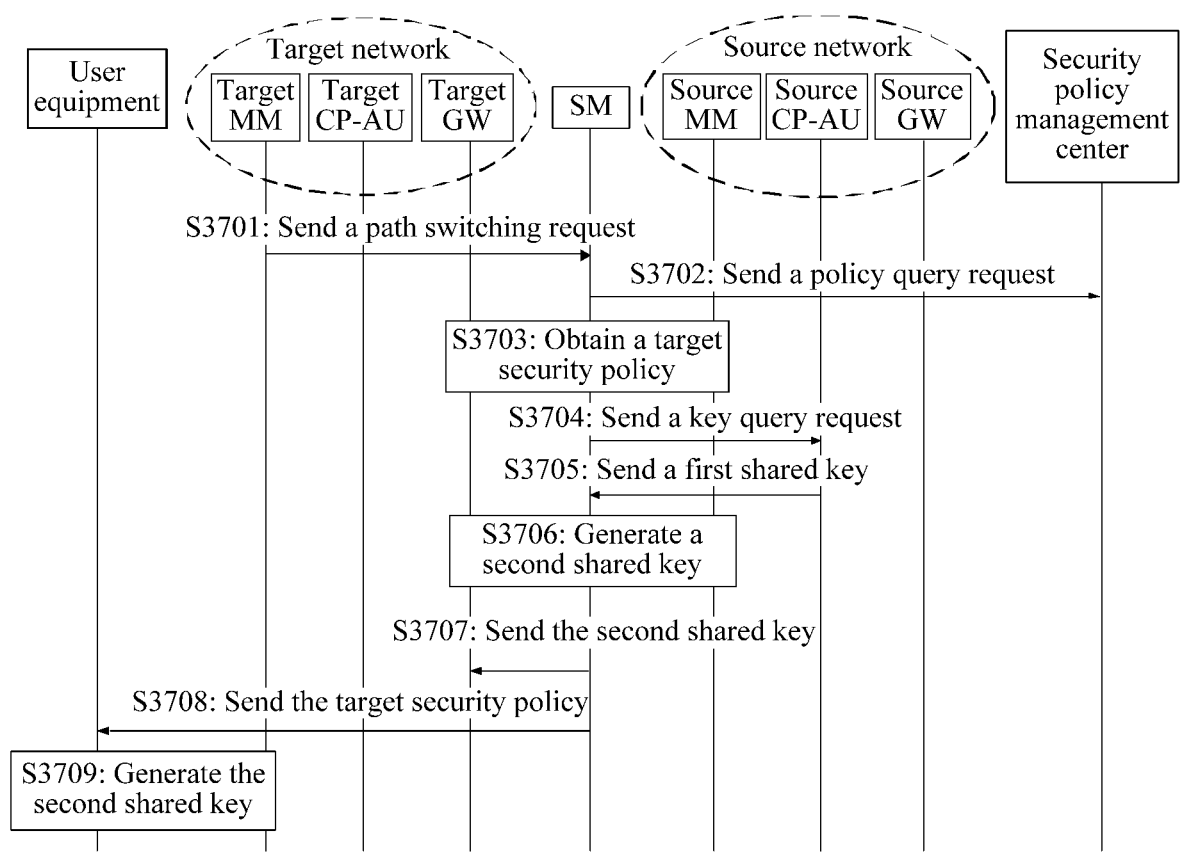
FIG. 3G is a schematic flowchart of another network handover protection method according to an embodiment of the present invention.

FIG. 3G is a schematic flowchart of another network handover protection method according to an embodiment of the present invention. The system 20 shown in FIG. 2A includes user equipment UE, a session management device SM, a source mobility management device MM, a target mobility management MM device, a source CP-AU, a target CP-AU, a source UP-GW, a target UP-GW, and a security policy function. A procedure shown in FIG. 3G needs to be implemented based on the system 20, and the procedure is as follows:

Step S3701: The target MM sends a path switching request to the SM. The path switching request is used to request to hand over the UE from a source network to a target network, and the path switching request includes information such as a UE identifier UE ID and an address of the target network.

Step S3702: The SM receives the path switching request and makes a response to the path switching request. A response manner includes: sending a policy query request including the UE ID to the security policy function, where the policy query request is used to request the security policy function to query, based on the UE ID, a security policy corresponding to the UE and feed back the queried security policy to the SM. Then, the SM performs a subsequent step. The security policy corresponding to the UE is an initial security policy. Certainly, the SM may store the initial security policy corresponding to the UE. In this case, the initial security policy may be directly obtained from the SM rather than the security policy function.

Step S3703: The SM obtains the target security policy. The target security policy is the initial security policy or a security policy generated based on the initial security policy. When the SM stores the initial security policy, the SM may generate the target security policy based on the initial security policy and other information. When the SM does not store the initial security policy, the security policy function may generate the target security policy based on the initial security policy and other information, and send the target security policy to the SM; or the security policy function sends the initial security policy to the SM, and the SM generates the target security policy.

Step S3704: The SM sends a key query request to the source CP-AU. The key query request is used to request to query a shared key used by the UE to protect secure data transmission in the source network. Certainly, the SM may alternatively store the shared key used by the UE to perform end-to-end protection on secure data transmission in the source network.

Step S3705: The source CP-AU receives the key query request and makes a response to the key query request to query the shared key, namely, a first shared key, used by the UE to protect secure data transmission in the source network. Then, the source CP-AU sends the first shared key to the SM, or the source CP-AU may send the first shared key to the target CP-AU, and then the target CP-AU forwards the first shared key to the SM.

Step S3706: The SM generates a second shared key based on the target security policy and the first shared key.

Step S3707: The SM sends the second shared key to the target UP-GW.

Step S3708: The SM sends the target security policy to the UE. Certainly, the SM may alternatively directly send the second shared key to the UE. In this way, the UE does not perform the subsequent operation of generating the second shared key based on the target security policy and the first shared key.

Step S3709: The UE receives the target security policy, and then generates the second shared key with reference to the target security policy and the first shared key that the UE already has.

Therefore, both the UE and the target UP-GW have the second shared key, so that the UE can perform end-to-end protection on secure data transmission in the target network by using the second shared key or a shared key derived based on the second shared key. It should be noted that after both the UE and the target UP-GW have the second shared key, the devices in the foregoing system may further interact with each other. For example, reverse data transmission is performed between the target UP-GW and the source WG, thereby ensuring continuity of a service of the UE from the source network to the target network. Optionally, before the foregoing session establishment-related steps are performed, the UE may initiate a session (session) re-establishment request to trigger the related steps. In addition, the steps may be performed in the foregoing described order, or not all the steps are performed in the foregoing described order, provided that there is no logical problem.

It should be noted that the target security policy may alternatively be the initial security policy. In this case, the foregoing step of generating the target security policy based on the initial security policy does not exist.

Figure 3H:
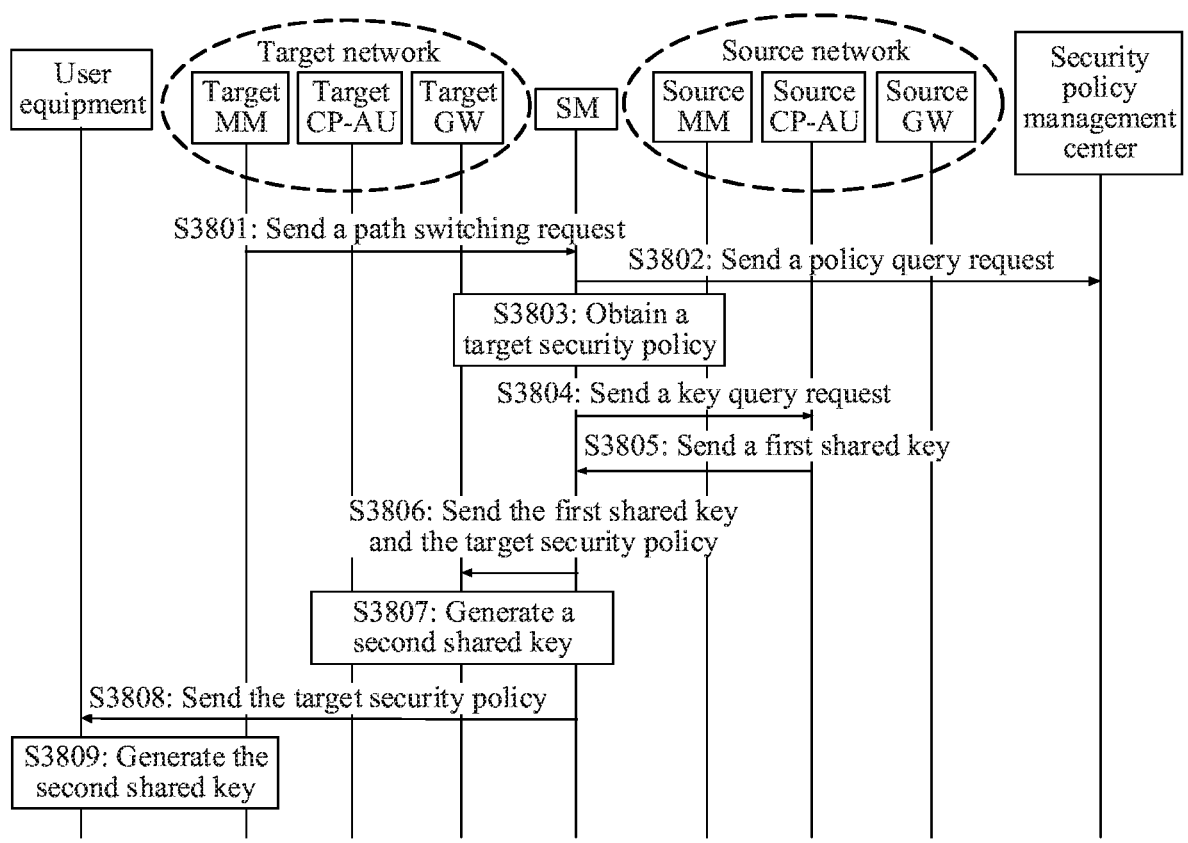
FIG. 3H is a schematic flowchart of another network handover protection method according to an embodiment of the present invention.

FIG. 3H is a schematic flowchart of another network handover protection method according to an embodiment of the present invention. The system 20 shown in FIG. 2A includes user equipment UE, a session management device SM, a source mobility management device MM, a target mobility management device MM, a source CP-AU, a target CP-AU, a source UP-GW, a target UP-GW, and a security policy function. A procedure shown in FIG. 3H needs to be implemented based on the system 20, and the procedure is as follows:

Step S3801: The target MM sends a path switching request to the SM. The path switching request is used to request to hand over the UE from a source network to a target network, and the path switching request includes information such as a UE identifier UE ID and an address of the target network.

Step S3802: The SM receives the path switching request and makes a response to the path switching request. A response manner includes: sending a policy query request including the UE ID to the security policy function, where the policy query request is used to request the security policy function to query, based on the UE ID, a security policy corresponding to the UE and feed back the queried security policy to the SM. Then, the SM performs a subsequent step. The security policy corresponding to the UE is an initial security policy. Certainly, the SM may store the initial security policy corresponding to the UE. In this case, the initial security policy may be directly obtained from the SM rather than the security policy function.

Step S3803: The SM obtains the target security policy. The target security policy is the initial security policy or a security policy generated based on the initial security policy. When the SM stores the initial security policy, the SM may generate the target security policy based on the initial security policy and other information. When the SM does not store the initial security policy, the security policy function may generate the target security policy based on the initial security policy and other information, and send the target security policy to the SM; or the security policy function sends the initial security policy to the SM, and the SM generates the target security policy.

Step S3804: The SM sends a key query request to the source CP-AU. The key query request is used to request to query a shared key used by the UE to protect secure data transmission in the source network. Certainly, the SM may alternatively store the shared key used by the UE to perform end-to-end protection on secure data transmission in the source network.

Step S3805: The source CP-AU receives the key query request and makes a response to the key query request to query the shared key, namely, a first shared key, used by the UE to protect secure data transmission in the source network. Then, the source CP-AU sends the first shared key to the SM, or the source CP-AU may send the first shared key to the target CP-AU, and then the target CP-AU forwards the first shared key to the SM.

Step S3806: The SM sends the target security policy and the first shared key to the target UP-GW.

Step S3807: The target UP-GW receives the target security policy and the first shared key, and generates a second shared key based on the target security policy and the first shared key. An occasion on which the target UP-GW generates the second shared key is not limited herein. In an optional solution, the target UP-GW immediately generates the second shared key after receiving the target security policy and the first shared key, so that a to-be-established session (session) can use the second shared key. In another optional solution, the target UP-GW does not generate the second shared key after receiving the target security policy and the first shared key, to be specific, a to-be-established session (session) still uses the first shared key of the UE in the source network. To be specific, in a very special case, a key of a target session does not need to be updated, but the target security policy still needs to be updated and stored for use in a next handover of the UE. A session established after the second shared key is generated can use the second shared key.

Step S3808: The SM sends the target security policy to the UE. Certainly, the SM may alternatively directly send the second shared key to the UE. In this way, the UE does not perform the subsequent operation of generating the second shared key based on the target security policy and the first shared key. Optionally, if an end-to-end protection key of a target session does not need to be updated, the SM sends the first shared key.

Step S3809: The UE receives the target security policy, and then generates the second shared key with reference to the target security policy and the first shared key that the UE already has. It may be understood that, if the second shared key is not immediately generated in step S3807 for the to-be-established session, the UE may not generate the second shared key first, but generates the second shared key when a new session is established subsequently.

Therefore, both the UE and the target UP-GW have the second shared key, so that the UE can perform end-to-end protection on secure data transmission in the target network by using the second shared key or a shared key derived based on the second shared key. It should be noted that after both the UE and the target UP-GW have the second shared key, the devices in the foregoing system may further interact with each other. For example, reverse data transmission is performed between the target UP-GW and the source WG, thereby ensuring continuity of a service of the UE from the source network to the target network. Optionally, before the foregoing session establishment-related steps are performed, the UE may initiate a session re-establishment request to trigger the related steps. In addition, the steps may be performed in the foregoing described order, or not all the steps are performed in the foregoing described order, provided that there is no logical problem.

It should be noted that the target security policy may alternatively be the initial security policy. In this case, the foregoing step of generating the target security policy based on the initial security policy does not exist. Optionally, when the initial security policy is the target security policy, both the target security policy and the first shared key that are required for generating the second shared key exist in the source network. Therefore, in step S3806, the SM does not need to send the initial security policy and the first shared key to the target UP-GW, but sends the first shared key and the initial security policy to the source UP-GW, so that the source UP-GW generates the second shared key based on the first shared key and the initial security policy, and then sends the second shared key to the target UP-GW. To be specific, a difference between the possibility and the solution of steps S3801 to S3809 lies in that, the second shared key used by the target UP-GW is generated by the source UP-GW rather than the target UP-GW. Optionally, the SM may send a message including the UE ID to the source UP-GW or the target UP-GW may forward the message including the UE ID that is sent by the SM to the source UP-GW, to trigger the UP-GW to obtain, based on the UE ID, the first shared key and the initial security policy that correspond to the UE, and generate the second shared key based on the first shared key and the initial security policy.

In the foregoing method embodiments, when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

The methods in the embodiments of the present invention are described above in detail. For ease of better implementing the foregoing solutions in the embodiments of the present invention, apparatuses in embodiments of the present invention are correspondingly provided below.

Figure 4:
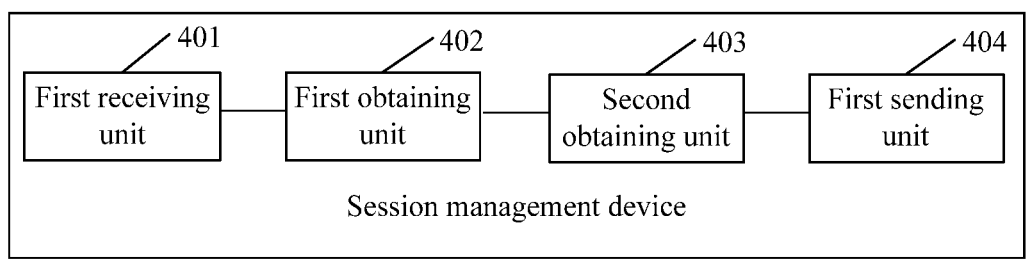
FIG. 4 is a schematic structural diagram of a session management device according to an embodiment of the present invention.

FIG. 4 is a schematic structural diagram of a session management device 40 according to an embodiment of the present invention. The session management device 40 may include a first receiving unit 401, a first obtaining unit 402, a second obtaining unit 403, and a first sending unit 404. The units are described below in detail.

The first receiving unit 401 is configured to receive a path switching request used to request to hand over user equipment UE from a source network to a target network. The source network is a network on which the UE currently camps.

The first obtaining unit 402 is configured to obtain a target security policy based on the path switching request. The target security policy is an initial security policy or a security policy obtained by processing the initial security policy according to a preset rule, the initial security policy defines a manner of generating a reference shared key, the reference shared key is a key generated based on a base key and is used by the UE to perform end-to-end protection on secure data transmission in the source network, and the base key is a key generated through two-way authentication between the UE and the source network or a key derived based on the key generated through two-way authentication between the UE and the source network.

The second obtaining unit 403 is configured to: obtain a second shared key generated based on a first shared key and the target security policy, and send the second shared key to a target gateway; or send the target security policy and the pre-obtained first shared key to the target gateway, so that the target gateway generates the second shared key based on the first shared key and the target security policy. The first shared key is the reference shared key or the base key, and the target gateway is a user plane gateway of the target network.

The first sending unit 404 is configured to send the second shared key to the UE; or send the target security policy to the UE, so that the UE generates the second shared key based on the first shared key and the target security policy. The second shared key is used to perform end-to-end protection on secure data transmission between the UE and the target gateway.

The foregoing units are run, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

In an optional solution, the first obtaining unit 402 is specifically configured to: send a security policy request message to a security policy function, where the security policy function is configured to manage a security policy related to a device in the source network and/or the target network; and receive the target security policy sent by the security policy function.

In another optional solution, the session management device includes a source session management device and a target session management device, the source session management device is configured to manage a session of each user equipment in the source network, and the target session management device is configured to manage a session of each user equipment in the target network. The source session management device includes the first receiving unit 401 and the first obtaining unit 402. The target session management device includes the second obtaining unit 403 and the first sending unit 404.

The first obtaining unit 402 is specifically configured to: obtain the initial security policy, and send the initial security policy to the target session management device, so that the target session management device obtains the target security policy based on the initial security policy.

The second obtaining unit 403 is specifically configured to: obtain the second shared key generated based on the first shared key and the target security policy, and send the second shared key to the target gateway.

In another optional solution, the source session management device further includes a second sending unit and a second receiving unit.

The second sending unit is configured to: after the first receiving unit receives the path switching request used to request to hand over the user equipment UE from the source network to the target network, and before the second obtaining unit 403 obtains the second shared key generated based on the first shared key and the target security policy and sends the second shared key to the target gateway, send a key request message to a source key management device. The source key management device is configured to manage a shared key that is of each user equipment accessing the source network and that is used to perform end-to-end protection on secure data transmission.

The second receiving unit is configured to: receive the first shared key sent by the source key management device based on the key request message, and send the first shared key to the target session management device.

In another optional solution, the second obtaining unit 403 is specifically configured to: send the target security policy to a target key management device, where the target key management device is configured to manage a shared key that is of each user equipment accessing the target network and that is used to perform end-to-end protection on secure data transmission; and receive the second shared key generated by the target key management device based on the target security policy and the pre-obtained first shared key.

In another optional solution, the second obtaining unit 403 is specifically configured to generate the second shared key based on the target security policy and the pre-obtained first shared key.

In another optional solution, both the initial security policy and the target security policy define at least one of a key algorithm, a key length, and a key update period.

In another optional solution, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

It should be noted that, for a specific implementation of the session management device 40, correspondingly refer to corresponding descriptions of the method embodiments shown in FIG. 2A, FIG. 2B, and FIG. 3A to FIG. 3H.

In the session management device 40 shown in FIG. 4, when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

Figure 5:
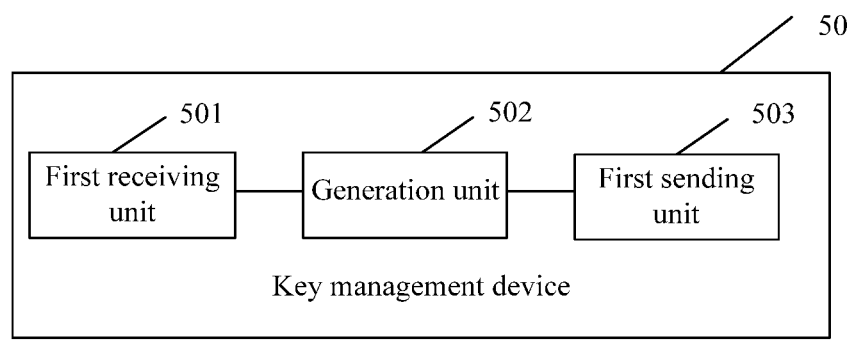
FIG. 5 is a schematic structural diagram of a key management device according to an embodiment of the present invention.

FIG. 5 is a schematic structural diagram of a key management device 50 according to an embodiment of the present invention. The key management device 50 may include a first receiving unit 501, a generation unit 502, and a first sending unit 503. The units are described below in detail.

The first receiving unit 501 is configured to receive a target security policy sent by a session management device after the session management device receives a path switching request. The path switching request is used to request to hand over user equipment UE from a source network to a target network, the target security policy is an initial security policy or a security policy obtained by processing the initial security policy according to a preset rule, the initial security policy defines a manner of generating a reference shared key, the reference shared key is a key generated based on a base key and is used by the UE to perform end-to-end protection on secure data transmission in the source network, and the base key is a key generated through two-way authentication between the UE and the source network or a key derived based on the key generated through two-way authentication between the UE and the source network.

The generation unit 502 is configured to generate a second shared key based on the target security policy and a pre-obtained first shared key. The first shared key is the reference shared key or the base key.

The first sending unit 503 is configured to send the second shared key to the session management device, so that the session management device sends the second shared key to a target gateway. The target gateway is a user plane gateway of the target network, and the second shared key is used to perform end-to-end protection on secure data transmission between the UE and the target gateway.

The foregoing units are run, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

In an optional solution, the key management device 50 further includes a second receiving unit, configured to: before the key management device generates the second shared key based on the target security policy and the pre-obtained first shared key, receive the first shared key sent by the session management device after the session management device receives the path switching request, where the session management device prestores the first shared key or the session management device pre-obtains the first shared key from a device that manages a key in the source network.

In another optional solution, the key management device 50 further includes a second sending unit, configured to: before the key management device generates the second shared key based on the target security policy and the pre-obtained first shared key, send a key query request to a device that manages a key in the source network, where the key query request is used to request to query a shared key used by the UE to perform end-to-end protection on secure data transmission in the source network; and a third receiving unit, configured to receive the first shared key sent by the device that manages a key.

In another optional solution, the key management device is configured to manage a key of each user equipment in the source network and the target network, and the key management device stores the first shared key.

In another optional solution, both the initial security policy and the target security policy define at least one of a key algorithm, a key length, and a key update period.

In another optional solution, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

It should be noted that, for a specific implementation of the key management device 50, correspondingly refer to corresponding descriptions of the method embodiments shown in FIG. 2A, FIG. 2B, and FIG. 3A to FIG. 3H.

In the key management device 50 shown in FIG. 5, when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

Figure 6:
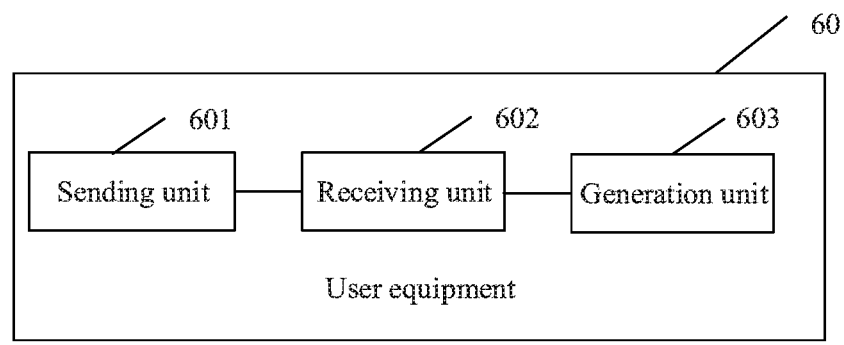
FIG. 6 is a schematic structural diagram of user equipment according to an embodiment of the present invention.

FIG. 6 is a schematic structural diagram of user equipment 60 according to an embodiment of the present invention. The user equipment 60 may include a sending unit 601, a receiving unit 602, and a generation unit 603. The units are described below in detail.

The sending unit 601 is configured to send a session re-establishment request to a target network. The session re-establishment request is used to trigger to re-establish a session to a session management device in the target network.

The receiving unit 602 is configured to receive a target security policy sent by the session management device after the session management device receives a path switching request. The path switching request is used to request to hand over the user equipment UE from a source network to the target network, the target security policy is an initial security policy or a security policy obtained by processing the initial security policy according to a preset rule, the initial security policy defines a manner of generating a reference shared key, the reference shared key is a key generated based on a base key and is used by the UE to perform end-to-end protection on secure data transmission in the source network, and the base key is a key generated through two-way authentication between the UE and the source network or a key derived based on the key generated through two-way authentication between the UE and the source network.

The generation unit 603 is configured to generate a second shared key based on the target security policy and a first shared key of the user equipment. The second shared key is used to perform end-to-end protection on secure data transmission between the UE and a target gateway, the target gateway is a user plane gateway of the target network, and the first shared key is the reference shared key or the base key.

The foregoing units are run, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

In an optional solution, both the initial security policy and the target security policy define at least one of a key algorithm, a key length, and a key update period.

In another optional solution, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

It should be noted that, for a specific implementation of the user equipment 60, correspondingly refer to corresponding descriptions of the method embodiments shown in FIG. 2A, FIG. 2B, and FIG. 3A to FIG. 3H.

In the user equipment 60 shown in FIG. 6, when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

Figure 7:
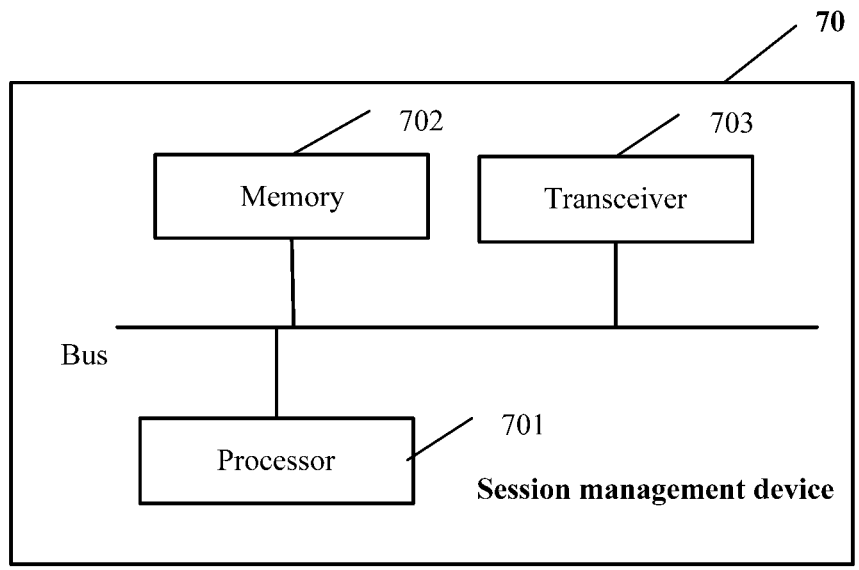
FIG. 7 is a schematic structural diagram of another session management device according to an embodiment of the present invention.

FIG. 7 is a session management device 70 according to an embodiment of the present invention. The session management device 70 includes a processor 701, a memory 702, and a transceiver 703. The processor 701, the memory 702, and the transceiver 703 are connected to each other by using a bus.

The memory 702 includes but is not limited to a random access memory (RAM), a read-only memory (ROM), an erasable programmable read-only memory (EPROM or flash memory), or a portable read-only memory (CD-ROM), and the memory 702 is configured to store a related instruction and data.

The transceiver 703 may include a receiver and a transmitter, for example, a radio frequency module.

The processor 701 may be one or more central processing units (CPU). When the processor 701 is a CPU, the CPU may be a single-core CPU or may be a multi-core CPU.

The processor 701 in the session management device 70 is configured to read program code stored in the memory 702, to perform the following operations. The operations include receiving, by using the transceiver 703, a path switching request used to request to hand over user equipment UE from a source network to a target network, where the source network is a network on which the UE currently camps. The operations include obtaining a target security policy based on the path switching request, where the target security policy is an initial security policy or a security policy obtained by processing the initial security policy according to a preset rule, the initial security policy defines a manner of generating a reference shared key, the reference shared key is a key generated based on a base key and is used by the UE to perform end-to-end protection on secure data transmission in the source network, and the base key is a key generated through two-way authentication between the UE and the source network or a key derived based on the key generated through two-way authentication between the UE and the source network. The operations include obtaining a second shared key generated based on a first shared key and the target security policy, and sending the second shared key to a target gateway; or sending the target security policy and the pre-obtained first shared key to the target gateway, so that the target gateway generates the second shared key based on the first shared key and the target security policy, where the first shared key is the reference shared key or the base key, and the target gateway is a user plane gateway of the target network. The operations include sending the second shared key to the UE by using the transceiver 703; or sending the target security policy to the UE by using the transceiver 703, so that the UE generates the second shared key based on the first shared key and the target security policy, where the second shared key is used to perform end-to-end protection on secure data transmission between the UE and the target gateway.

The foregoing operations are performed, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

In an optional solution, the obtaining, by the processor 701, a target security policy based on the path switching request is specifically: sending, by using the transceiver 703, a security policy request message to a security policy function, where the security policy function is configured to manage a security policy related to a device in the source network and/or the target network; and receiving, by using the transceiver 703, the target security policy sent by the security policy function.

In another optional solution, the session management device 70 includes a source session management device and a target session management device, the source session management device is configured to manage a session of each user equipment in the source network, and the target session management device is configured to manage a session of each user equipment in the target network; the source session management device includes a first processor and a first transceiver; and the target session management device includes a second processor and a second transceiver. The receiving, by the processor 701 by using the transceiver 703, a path switching request used to request to hand over user equipment UE from a source network to a target network is specifically: receiving, by the first processor by using the first transceiver, the path switching request used to request to hand over the user equipment UE from the source network to the target network. The obtaining, by the processor 701, a target security policy based on the path switching request includes: obtaining, by the first processor, the initial security policy, and sending the initial security policy to the target session management device, and obtaining the target security policy based on the initial security policy. The obtaining, by the processor 701, a second shared key generated based on a first shared key and the target security policy, and sending the second shared key to a target gateway includes: obtaining, by the second processor, the second shared key generated based on the first shared key and the target security policy, and sending the second shared key to the target gateway. The sending, by the processor 701, the target security policy to the UE by using the transceiver 703 includes: sending, by the second processor, the target security policy to the UE by using the second transceiver.

In another optional solution, after the receiving, by the first processor 701 by using the first transceiver 703, a path switching request used to request to hand over user equipment UE from a source network to a target network, and before the obtaining, by the second processor 701, a second shared key generated based on the first shared key and the target security policy, and sending the second shared key to a target gateway, the first processor 701 is further configured to: send a key request message to a source key management device by using the first transceiver 703, where the source key management device is configured to manage a shared key that is of each user equipment accessing the source network and that is used to perform end-to-end protection on secure data transmission. The first processor 701 is further configured to receive, by using the first transceiver 703, the first shared key sent by the source key management device based on the key request message, and send the first shared key to the target session management device.

In another optional solution, the obtaining, by the processor 701, a second shared key generated based on a first shared key and the target security policy is specifically: sending the target security policy to a target key management device, where the target key management device is configured to manage a shared key that is of each user equipment accessing the target network and that is used to perform end-to-end protection on secure data transmission; and receiving the second shared key generated by the target key management device based on the target security policy and the pre-obtained first shared key.

In another optional solution, the obtaining, by the processor 701, a second shared key generated based on a first shared key and the target security policy is specifically: generating the second shared key based on the target security policy and the pre-obtained first shared key.

In another optional solution, both the initial security policy and the target security policy define at least one of a key algorithm, a key length, and a key update period.

In another optional solution, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

It should be noted that, for a specific implementation of the session management device 70, correspondingly refer to corresponding descriptions of the method embodiments shown in FIG. 2A, FIG. 2B, and FIG. 3A to FIG. 3H.

In the session management device 70 shown in FIG. 7, when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

Figure 8:
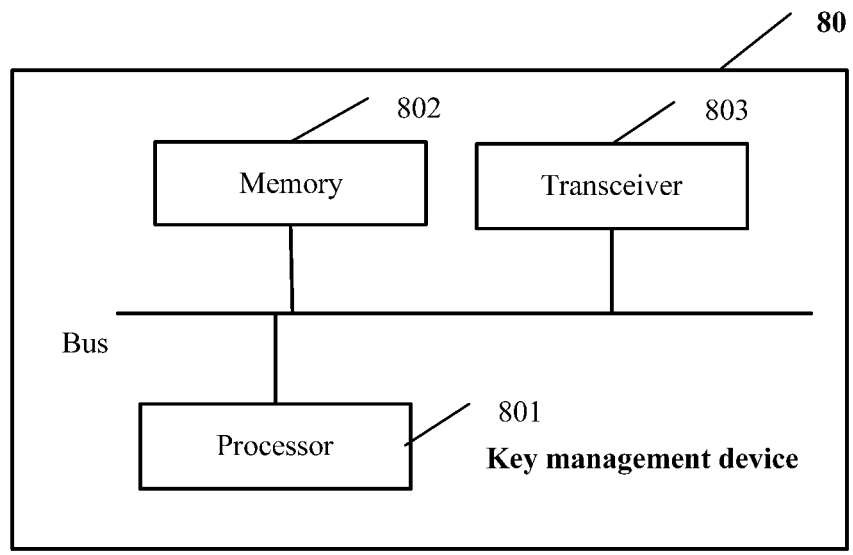
FIG. 8 is a schematic structural diagram of another key management device according to an embodiment of the present invention.

FIG. 8 is a key management device 80 according to an embodiment of the present invention. The key management device 80 includes a processor 801, a memory 802, and a transceiver 803. The processor 801, the memory 802, and the transceiver 803 are connected to each other by using a bus.

The memory 802 includes but is not limited to a random access memory (RAM), a read-only memory (ROM), an erasable programmable read-only memory (EPROM or flash memory), or a portable read-only memory (CD-ROM), and the memory 802 is configured to store a related instruction and data.

The transceiver 803 may include a receiver and a transmitter, for example, a radio frequency module.

The processor 801 may be one or more central processing units (CPU). When the processor 801 is a CPU, the CPU may be a single-core CPU or may be a multi-core CPU.

The processor 801 in the key management device 80 is configured to read program code stored in the memory 802, to perform the following operations: receiving, by using the transceiver 803, a target security policy sent by a session management device after the session management device receives a path switching request, where the path switching request is used to request to hand over user equipment UE from a source network to a target network, the target security policy is an initial security policy or a security policy obtained by processing the initial security policy according to a preset rule, the initial security policy defines a manner of generating a reference shared key, the reference shared key is a key generated based on a base key and is used by the UE to perform end-to-end protection on secure data transmission in the source network, and the base key is a key generated through two-way authentication between the UE and the source network or a key derived based on the key generated through two-way authentication between the UE and the source network; generating a second shared key based on the target security policy and a pre-obtained first shared key, where the first shared key is the reference shared key or the base key; and sending the second shared key to the session management device by using the transceiver 803, so that the session management device sends the second shared key to a target gateway, where the target gateway is a user plane gateway of the target network, and the second shared key is used to perform end-to-end protection on secure data transmission between the UE and the target gateway.

The foregoing operations are performed, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

In another optional solution, before generating the second shared key based on the target security policy and the pre-obtained first shared key, the processor 801 is further configured to: receive, by using the transceiver 803, the first shared key sent by the session management device after the session management device receives the path switching request, where the session management device prestores the first shared key or the session management device pre-obtains the first shared key from a device that manages a key in the source network.

In another optional solution, before generating the second shared key based on the target security policy and the pre-obtained first shared key, the processor 801 is further configured to: send, by using the transceiver 803, a key query request to a device that manages a key in the source network, where the key query request is used to request to query a shared key used by the UE to perform end-to-end protection on secure data transmission in the source network; and receive, by using the transceiver 803, the first shared key sent by the device that manages a key.

In another optional solution, the key management device is configured to manage a key of each user equipment in the source network and the target network, and the key management device stores the first shared key.

In another optional solution, both the initial security policy and the target security policy define at least one of a key algorithm, a key length, and a key update period.

In another optional solution, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

It should be noted that, for a specific implementation of the key management device 80, correspondingly refer to corresponding descriptions of the method embodiments shown in FIG. 2A, FIG. 2B, and FIG. 3A to FIG. 3H.

In the key management device 80 shown in FIG. 8, when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

Figure 9:
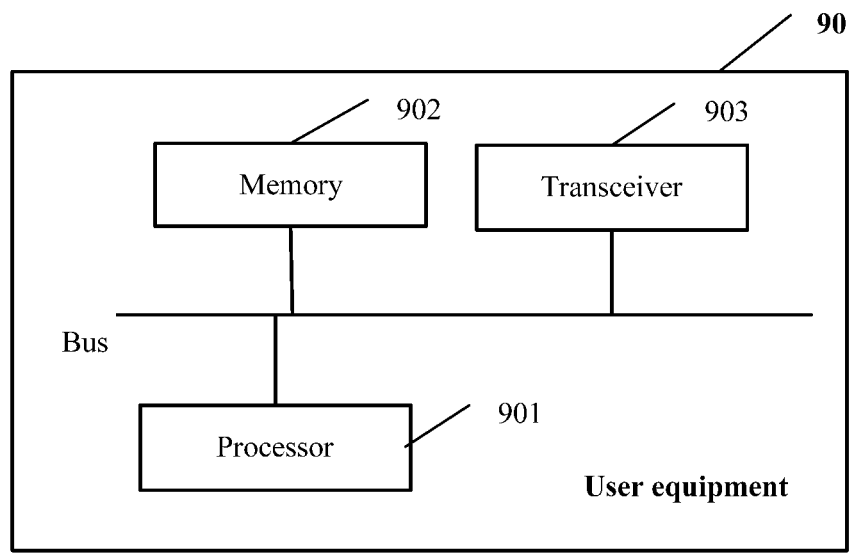
FIG. 9 is a schematic structural diagram of another user equipment according to an embodiment of the present invention.

FIG. 9 is user equipment 90 according to an embodiment of the present invention. The user equipment 90 includes a processor 901, a memory 902, and a transceiver 903. The processor 901, the memory 902, and the transceiver 903 are connected to each other by using a bus.

The memory 902 includes but is not limited to a random access memory (RAM), a read-only memory (ROM), an erasable programmable read-only memory (EPROM or flash memory), or a portable read-only memory (CD-ROM), and the memory 902 is configured to store a related instruction and data.

The transceiver 903 may include a receiver and a transmitter, for example, a radio frequency module.

The processor 901 may be one or more central processing units (CPU). When the processor 901 is a CPU, the CPU may be a single-core CPU or may be a multi-core CPU.

The processor 901 in the user equipment 90 is configured to read program code stored in the memory 902, to perform the following operations: sending, by using the transceiver 903, a session re-establishment request to a target network, where the session re-establishment request is used to trigger to re-establish a session to a session management device in the target network; receiving, by using the transceiver 903, a target security policy sent by the session management device after the session management device receives a path switching request, where the path switching request is used to request to hand over the user equipment UE from a source network to the target network, the target security policy is an initial security policy or a security policy obtained by processing the initial security policy according to a preset rule, the initial security policy defines a manner of generating a reference shared key, the reference shared key is a key generated based on a base key and is used by the UE to perform end-to-end protection on secure data transmission in the source network, and the base key is a key generated through two-way authentication between the UE and the source network or a key derived based on the key generated through two-way authentication between the UE and the source network; and generating a second shared key based on the target security policy and a first shared key of the user equipment, where the second shared key is used to perform end-to-end protection on secure data transmission between the UE and a target gateway, the target gateway is a user plane gateway of the target network, and the first shared key is the reference shared key or the base key.

The foregoing operations are performed, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

In an optional solution, both the initial security policy and the target security policy define at least one of a key algorithm, a key length, and a key update period.

In another optional solution, the target security policy is obtained based on a security requirement of the user equipment and/or a security requirement of the target gateway, the security requirement of the user equipment represents at least one of a key algorithm, a key length, and a key update period that are acceptable by the user equipment, and the security requirement of the target gateway represents at least one of a key algorithm, a key length, and a key update period that are acceptable by the target gateway.

It should be noted that, for a specific implementation of the user equipment 90, correspondingly refer to corresponding descriptions of the method embodiments shown in FIG. 2A, FIG. 2B, and FIG. 3A to FIG. 3H.

In the user equipment 90 shown in FIG. 9, when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

Figure 10:
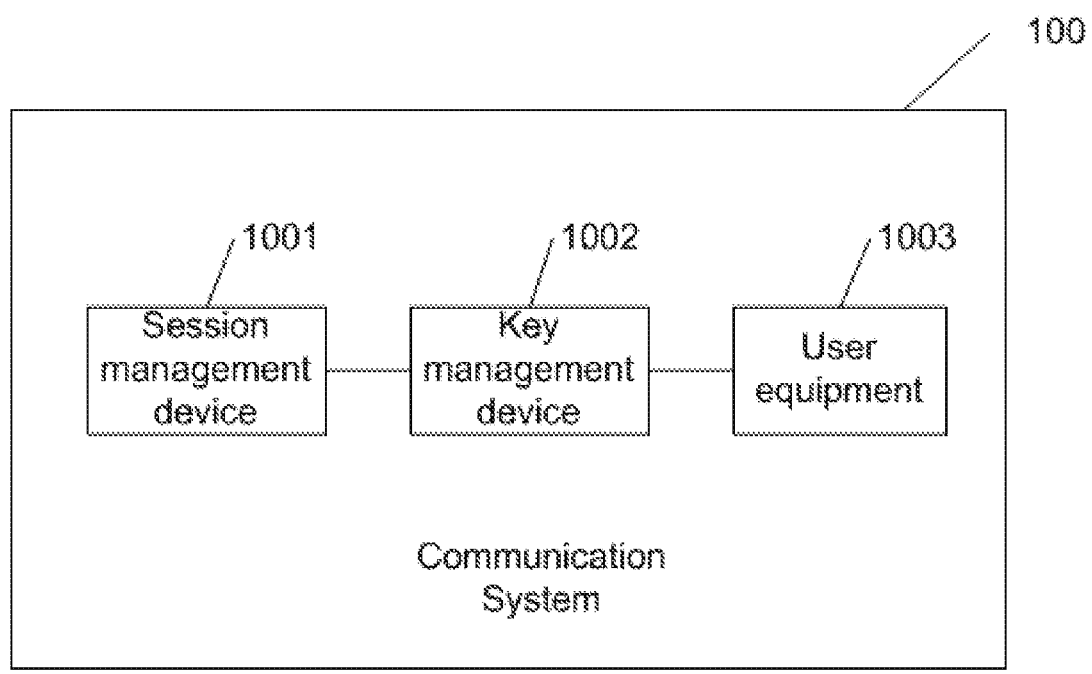
FIG. 10 is a schematic structural diagram of a communications system according to an embodiment of the present invention.

FIG. 10 is a schematic structural diagram of a communications system 100 according to an embodiment of the present invention. The communications system 100 includes a session management device 1001, a key management device 1002, and user equipment 1003. The session management device 1001 is the session management device 40 shown in FIG. 4 or the session management device 70 shown in FIG. 7, the key management device 1002 is the key management device 50 shown in FIG. 5 or the key management device 80 shown in FIG. 8, and the user equipment 1003 is the user equipment 60 shown in FIG. 6 or the user equipment 90 shown in FIG. 9.

In conclusion, the embodiments of the present invention are implemented, so that when the UE is handed over to the target network, the target security policy is generated by using a network element in the source network or the target network, then the second shared key is generated based on the target security policy and the first shared key, and finally the UE and the target gateway in the target network use the second shared key as a shared key used to perform end-to-end protection on secure data transmission between the UE and the target gateway. Therefore, the UE can still securely transmit data after the network handover.

A person of ordinary skill in the art may understand that all or some of the procedures of the methods in the foregoing embodiments may be implemented by a computer program instructing relevant hardware. The program may be stored in a computer-readable storage medium. When the program is executed, the procedures of the foregoing methods are performed. The foregoing storage medium includes: any medium that can store program code, such as a ROM, a RAM, a magnetic disk, or an optical disc.

The foregoing embodiments are merely preferred embodiments of the present invention, and are not intended to limit the protection scope of the present invention. A person of ordinary skill in the art may understand that all or some of the procedures that implement the foregoing embodiments and equivalent modifications made in accordance with the claims of the present invention shall fall within the scope of the present invention

What is claimed is:

1. A method, comprising:
   receiving, by a session management device, a path switching request requesting a hand over of user equipment (UE) from a source network to a target network, the source network being a network on which the UE is camping when the path switching request is received by the session management device;
   obtaining, by the session management device, a target security policy according to the path switching request and an initial security policy, the initial security policy defining a manner of generating a reference shared key according to a base key, the reference shared key being used by the UE to perform end-to-end protection on first secure data transmission in the source network, and the base key being generated through two-way authentication between the UE and the source network;
   sending, by the session management device, a second shared key to a target gateway, the session management device obtaining the second shared key according to a first shared key and the target security policy, the first shared key being the reference shared key or the base key, and the target gateway being a user plane gateway of the target network; and sending, by the session management device, the target security policy to the UE, causing the UE to generate the second shared key according to the first shared key and the target security policy, and further causing the UE to perform end-to-end protection on second secure data transmission between the UE and the target gateway using the second shared key.

2. The method according to claim 1, wherein obtaining the target security policy comprises:

sending, by the session management device, a security policy request message to a security policy function, the security policy function being configured to manage a security policy related to a first device in the source network or a second device in the target network; and receiving, by the session management device, the target security policy from the security policy function.

3. The method according to claim 1, wherein:

the session management device comprises:
a source session management device, the source session management device being configured to manage a first respective session of each first UE of a plurality of first UEs in the source network; and
a target session management device, the target session management device being configured to manage a second respective session of each second UE of a plurality of second UEs in the target network;

receiving the path switching request comprises receiving, by the source session management device, the path switching request requesting the hand over of the UE from the source network to the target network;

obtaining the target security policy comprises:
obtaining, by the source session management device, the initial security policy; and
sending, by the source session management device, the initial security policy to the target session management device, causing the target session management device to obtain the target security policy according to the initial security policy;

obtaining the second shared key comprises obtaining, by the target session management device, the second shared key having been generated according to the first shared key and the target security policy;

sending the second shared key to the target gateway comprises sending, by the target session management device, the second shared key to the target gateway; and sending the target security policy to the UE comprises sending, by the target session management device, the target security policy to the UE.

4. The method according to claim 3, further comprising:

sending, by the source session management device, a key request message to a source key management device, the source key management device being configured to manage a respective shared key of each third UE of a plurality of third UEs accessing the source network, each third UE performing end-to-end protection on secure data transmission using the respective shared key; and receiving, by the source session management device, the first shared key from the source key management device based on the key request message; and sending the first shared key to the target session management device.

5. The method according to claim 1, wherein obtaining the second shared key comprises:

sending the target security policy to a target key management device, the target key management device being configured to manage a respective shared key of each first UE of a plurality of first UEs accessing the target network, each first UE performing end-to-end protection on third secure data transmission using the respective shared key; and receiving the second shared key generated by the target key management device according to the target security policy and the first shared key.

6. The method according to claim 1, wherein obtaining the second shared key comprises:

pre-obtaining the first shared key before receiving the path switching request; and generating the second shared key according to the target security policy and the pre-obtained first shared key.

7. The method according to claim 1, wherein both the initial security policy and the target security policy define a key algorithm, a key length, or a key update period.

8. A method, comprising:

sending, by user equipment (UE), a session re-establishment request to a target network, the session re-establishment request triggering session reestablishment to a session management device in the target network;

receiving, by the UE, a target security policy sent by the session management device, the target security policy being received based at least on a path switching request received by the session management device, the path switching request requesting hand over of the UE from a source network to the target network, the target security policy having been generated according to an initial security policy, the initial security policy defining a manner of generating a reference shared key according to a base key, the reference shared key being used by the UE to perform end-to-end protection on first secure data transmission in the source network, and the base key being generated through two-way authentication between the UE and the source network; and generating, by the UE, a second shared key according to the target security policy and a first shared key of the UE, the second shared key being used to perform end-to-end protection on second secure data transmission between the UE and a target gateway, the target gateway being a user plane gateway of the target network, and the first shared key being the reference shared key or the base key.

9. The method according to claim 8, wherein both the initial security policy and the target security policy define a key algorithm, a key length, or a key update period.

10. The method according to claim 8, wherein the target security policy is obtained according to a security requirement of the UE or a security requirement of the target gateway, the security requirement of the UE represents a key algorithm, a key length, or a key update period that is acceptable by the UE, and the security requirement of the target gateway represents a key algorithm, a key length, or a key update period that is acceptable by the target gateway.

11. A device, comprising:
a first processor;
a first transceiver; and a non-transitory computer-readable storage medium storing a program to be executed by the first processor, the program including instructions for:

receiving, using the first transceiver, a path switching request requesting hand over of user equipment (UE) from a source network to a target network, the source network being a network on which the UE is camping when the path switching request is received by the device;

obtaining a target security policy according to the path switching request and an initial security policy, the initial security policy defining a manner of generating a reference shared key according to a base key, the reference shared key being used by the UE to perform end-to-end protection on first secure data transmission in the source network, and the base key being generated through two-way authentication between the UE and the source network;

sending, using the first transceiver, a second shared key to a target gateway the device obtaining the second shared key according to a first shared key and the target security policy, the first shared key being the reference shared key or the base key, and the target gateway being a user plane gateway of the target network; and sending, using the first transceiver, the target security policy to the UE, causing the UE to generate the second shared key according to the first shared key and the target security policy, and further causing the UE to perform end-to-end protection on second secure data transmission between the UE and the target gateway using the second shared key.

12. The device according to claim 11, wherein the instructions for obtaining the target security policy comprise further instructions for:

sending, using the first transceiver, a security policy request message to a security policy function, the security policy function being configured to manage a security policy related to a first device in the source network or a second device in the target network; and receiving, using the first transceiver, the target security policy from the security policy function.

13. The device according to claim 11, wherein:
the device further comprises:
a source session management device configured to manage a first respective session of each first UE of a plurality of first UEs in the source network, the source session management device comprising a second processor and a second transceiver; and
a target session management device configured to manage a second respective session of each second UE of a plurality of second UEs in the target network, the target session management device comprising a third processor and a third transceiver;

the instructions for receiving the path switching request comprise further instructions for receiving, by the second processor using the second transceiver, the path switching request requesting the hand over of the UE from the source network to the target network;

the instructions for obtaining the target security policy comprise further instructions for:
obtaining, by the second processor, the initial security policy; and
sending, by the second processor, the initial security policy to the target session management device, causing the target session management device to obtain the target security policy according to the initial security policy;

the instructions for obtaining the second shared key comprise further instructions for obtaining, by the third processor, the second shared key generated according to the first shared key and the target security policy;

the instructions for sending the second shared key to the target gateway comprise further instructions for sending, by the third processor using the third transceiver, the second shared key to the target gateway; and the instructions for sending the target security policy to the UE comprise further instructions for sending, by the third processor using the third transceiver, the target security policy to the UE.

14. The device according to claim 13, wherein the instructions comprise further instructions for:

sending, using the second transceiver, a key request message to a source key management device, the source key management device being configured to manage a respective shared key of each third UE of a plurality of third UEs accessing the source network, each third UE performing end-to-end protection on secure data transmission using the respective shared key;

receiving, using the first transceiver, the first shared key sent by the source key management device according the key request message; and sending the first shared key to the target session management device.

15. The device according to claim 11, wherein the instructions for obtaining the second shared key comprise further instructions for:

sending the target security policy to a target key management device, the target key management device being configured to manage a respective shared key of each first UE of a plurality of first UEs accessing the target network, each first UE performing end-to-end protection on third secure data transmission using the respective shared key; and receiving the second shared key generated by the target key management device according to the target security policy and the first shared key.

16. The device according to claim 11, wherein the instructions for obtaining the second shared key comprise further instructions for:

pre-obtaining the first shared key before receiving the path switching request; and generating the second shared key according to the target security policy and the pre-obtained first shared key.

17. The device according to claim 11, wherein both the initial security policy and the target security policy define a key algorithm, a key length, or a key update period.

18. User equipment (UE), comprising;
a processor;
a transceiver; and
a non-transitory computer-readable storage medium storing a program to be executed by the processor, the program including instructions for:

sending a session re-establishment request to a target network, the session re-establishment request triggering session re-establishment to a session management device in the target network;

receiving a target security policy sent by the session management device, the target security policy being received based at least on a path switching request received by the session management device, the path switching request requesting hand over of the UE from a source network to the target network, the target security policy having been generated according to an initial security policy, the initial security policy defining a manner of generating a reference shared key according to a base key, the reference shared key being used by the UE to perform end-to-end protection on first secure data transmission in the source network, and the base key being generated through two-way authentication between the UE and the source network; and generating a second shared key based on the target security policy and a first shared key of the UE, the second shared key being to perform end-to-end protection on second secure data transmission between the UE and a target gateway, the target gateway being a user plane gateway of the target network, and the first shared key being the reference shared key or the base key.

19. The UE according to claim 18, wherein both the initial security policy and the target security policy define a key algorithm, a key length, or a key update period.

20. The UE according to claim 18, wherein the target security policy is obtained according to a security requirement of the UE or a security requirement of the target gateway, the security requirement of the UE represents a key algorithm, a key length, or a key update period that is acceptable by the UE, and the security requirement of the target gateway represents a key algorithm, a key length, or a key update period that is acceptable by the target gateway.

* * * * *

UNITED STATES PATENT AND TRADEMARK OFFICE
CERTIFICATE OF CORRECTION

PATENT NO. : 10,959,091 B2
APPLICATION NO. : 16/351254
DATED : March 23, 2021
INVENTOR(S) : Rong Wu Page 1 of 1

It is certified that error appears in the above-identified patent and that said Letters Patent is hereby corrected as shown below:

In the Claims

In Column 52, Line 60, Claim 18, delete "sending a session" and insert --sending, using the transceiver, a session--.

In Column 52, Line 64, Claim 18, delete "receiving a target" and insert --receiving, using the transceiver, a target--.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*